United States Patent
Yamazaki et al.

(10) Patent No.: US 10,241,373 B2
(45) Date of Patent: Mar. 26, 2019

(54) DISPLAY DEVICE COMPRISING FIRST AND SECOND TRANSISTORS WHEREIN GATES OF THE FIRST AND SECOND TRANSISTORS ARE SUPPLIED WITH A SAME SELECTION SIGNAL

(71) Applicant: Semiconductor Energy Laboratory Co., Ltd., Atsugi-shi, Kanagawa-ken (JP)

(72) Inventors: Shunpei Yamazaki, Setagaya (JP); Kei Takahashi, Isehara (JP)

(73) Assignee: Semiconductor Energy Laboratory co., Ltd., Kanagawa-ken (JP)

( * ) Notice: Subject to any disclaimer, the term of this patent is extended or adjusted under 35 U.S.C. 154(b) by 0 days.

(21) Appl. No.: 15/868,188

(22) Filed: Jan. 11, 2018

(65) Prior Publication Data

US 2018/0203319 A1    Jul. 19, 2018

(30) Foreign Application Priority Data

Jan. 16, 2017 (JP) .................................. 2017-004934
Jan. 25, 2017 (JP) .................................. 2017-011397

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1368* (2013.01); *G02F 1/133514* (2013.01);
(Continued)

(58) Field of Classification Search
CPC .......... G02F 2001/136245; G02F 2001/13629; G02F 2202/103; G02F 2001/13606
See application file for complete search history.

(56) References Cited

U.S. PATENT DOCUMENTS 7,674,650 B2    3/2010    Akimoto et al.
7,732,819 B2    6/2010    Akimoto et al.
(Continued)

FOREIGN PATENT DOCUMENTS

CN    001237258 A    12/1999
CN    001577090 A    2/2005
(Continued)

OTHER PUBLICATIONS

International Search Report (Application No. PCT/IB2018/050116) dated Apr. 17, 2018.
(Continued)

*Primary Examiner* — Paul Lee
(74) *Attorney, Agent, or Firm* — Robinson Intellectual Property Law Office, P.C.; Eric J. Robinson

(57) ABSTRACT

A display device that is suitable for increasing in size is provided. A display device with high resolution is provided. The display device has a structure in which two adjacent gate lines are supplied with the same selection signal. In addition, two pixels adjacent in the column direction are connected to respective source lines. Furthermore, one of the two source lines overlaps with a conductive layer functioning as a pixel electrode. Moreover, part of a semiconductor layer of a transistor is provided between the two source lines.

12 Claims, 23 Drawing Sheets

(51) Int. Cl.
*G02F 1/1335* (2006.01)
*G02F 1/1368* (2006.01)
*G06F 3/041* (2006.01)
*G09G 3/36* (2006.01)
*G02F 1/136* (2006.01)

(52) U.S. Cl.
CPC .............. *G02F 1/13338* (2013.01); *G02F 2001/13606* (2013.01); *G02F 2001/13629* (2013.01); *G02F 2202/103* (2013.01); *G06F 3/041* (2013.01); *G09G 3/3677* (2013.01); *G09G 3/3688* (2013.01); *G09G 2300/0426* (2013.01)

(56) References Cited

U.S. PATENT DOCUMENTS

| | | | |
|---|---|---|---|
| 7,910,490 B2 | 3/2011 | Akimoto et al. | |
| 7,932,521 B2 | 4/2011 | Akimoto et al. | |
| 8,003,989 B2 | 8/2011 | Nakajima et al. | |
| 8,023,055 B2 | 9/2011 | Nakajima et al. | |
| 8,274,077 B2 | 9/2012 | Akimoto et al. | |
| 8,400,817 B2 | 3/2013 | Yamazaki et al. | |
| 8,450,783 B2 | 5/2013 | Yamazaki et al. | |
| 8,466,463 B2 | 6/2013 | Akimoto et al. | |
| 8,629,069 B2 | 1/2014 | Akimoto et al. | |
| 8,654,270 B2 | 2/2014 | Nakajima et al. | |
| 8,669,550 B2 | 3/2014 | Akimoto et al. | |
| 8,790,959 B2 | 7/2014 | Akimoto et al. | |
| 8,796,069 B2 | 8/2014 | Akimoto et al. | |
| 9,041,875 B2 | 5/2015 | Nakajima et al. | |
| 9,099,562 B2 | 8/2015 | Akimoto et al. | |
| 9,217,903 B2 | 12/2015 | Koyama | |
| 9,640,630 B2 | 5/2017 | Nakajima et al. | |
| 2001/0015626 A1 | 8/2001 | Ozawa | |
| 2004/0266039 A1 | 12/2004 | Ahn et al. | |
| 2008/0308805 A1 | 12/2008 | Akimoto et al. | |
| 2010/0103085 A1* | 4/2010 | Lee .............. | G02F 1/134363 345/92 |
| 2011/0104851 A1 | 5/2011 | Akimoto et al. | |
| 2011/0121290 A1 | 5/2011 | Akimoto et al. | |
| 2011/0156994 A1 | 6/2011 | Koyama | |
| 2012/0099037 A1* | 4/2012 | Park ............. | G02F 1/13624 349/33 |
| 2012/0154308 A1* | 6/2012 | Jeon ............. | G02F 1/13338 345/173 |
| 2012/0200481 A1 | 8/2012 | Tsubata | |
| 2012/0268676 A1* | 10/2012 | Kim ............. | G09G 3/3659 349/38 |
| 2013/0321483 A1* | 12/2013 | You ............. | G09G 5/10 345/690 |
| 2013/0342777 A1* | 12/2013 | Jeong ........... | G02F 1/134336 349/38 |
| 2014/0055696 A1 | 2/2014 | Lee et al. | |
| 2014/0092355 A1 | 4/2014 | Teranuma et al. | |
| 2014/0104151 A1 | 4/2014 | Yamazaki et al. | |
| 2015/0160524 A1* | 6/2015 | Shin ............. | G02F 1/136213 349/42 |
| 2015/0340513 A1 | 11/2015 | Akimoto et al. | |
| 2017/0301769 A1 | 10/2017 | Nakajima et al. | |
| 2018/0011355 A1 | 1/2018 | Miyake et al. | |

FOREIGN PATENT DOCUMENTS

| | | |
|---|---|---|
| CN | 102648437 A | 8/2012 |
| CN | 103631044 A | 3/2014 |
| EP | 0932137 A | 7/1999 |
| EP | 2490068 A | 8/2012 |
| EP | 2700996 A | 2/2014 |
| JP | 11-024604 A | 1/1999 |
| JP | 2001-053283 A | 2/2001 |
| JP | 2003-330431 A | 11/2003 |
| JP | 2005-018074 A | 1/2005 |
| JP | 2007-096055 A | 4/2007 |
| JP | 2007-123861 A | 5/2007 |
| JP | 2011-150315 A | 8/2011 |
| JP | 2014-041320 A | 3/2014 |
| KR | 2005-0084467 A | 8/2005 |
| KR | 10-0947538 | 3/2010 |
| KR | 2014-0025220 A | 3/2014 |
| TW | 388853 | 5/2000 |
| TW | 200509203 | 3/2005 |
| TW | 201133092 | 10/2011 |
| WO | WO-1999/001857 | 1/1999 |
| WO | WO-2011/045978 | 4/2011 |
| WO | WO-2011/077916 | 6/2011 |

OTHER PUBLICATIONS

Written Opinion (Application No. PCT/IB2018/050116) dated Apr. 17, 2018.

\* cited by examiner

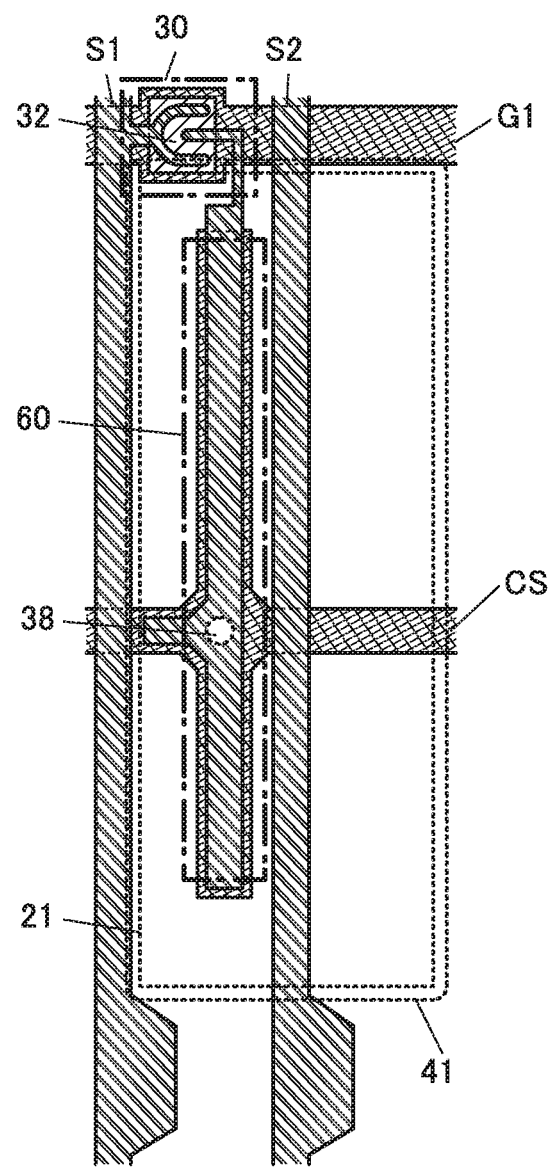

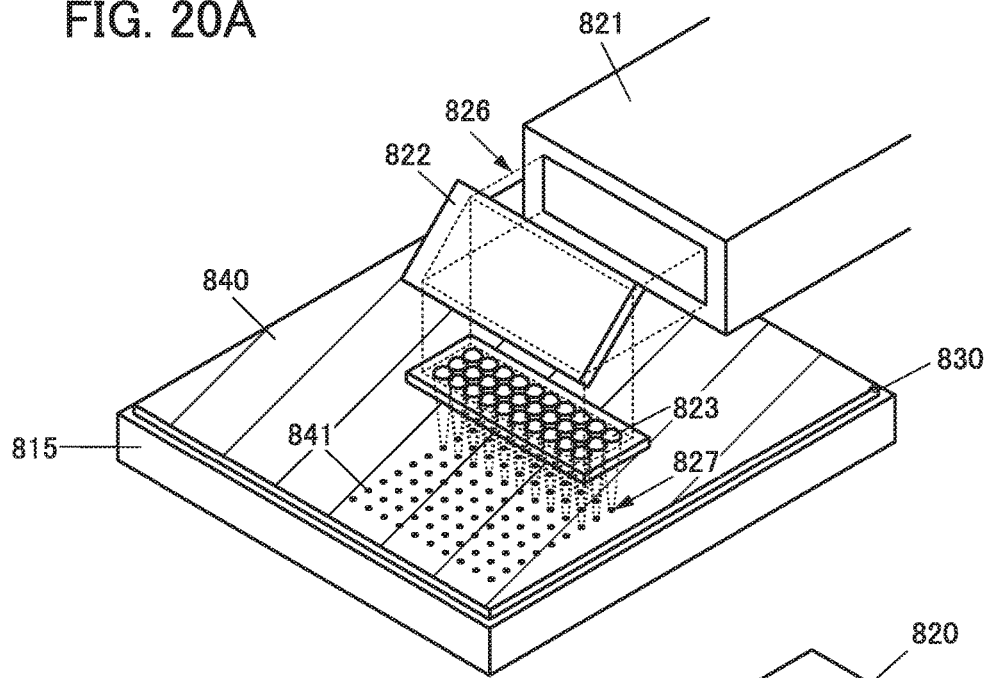
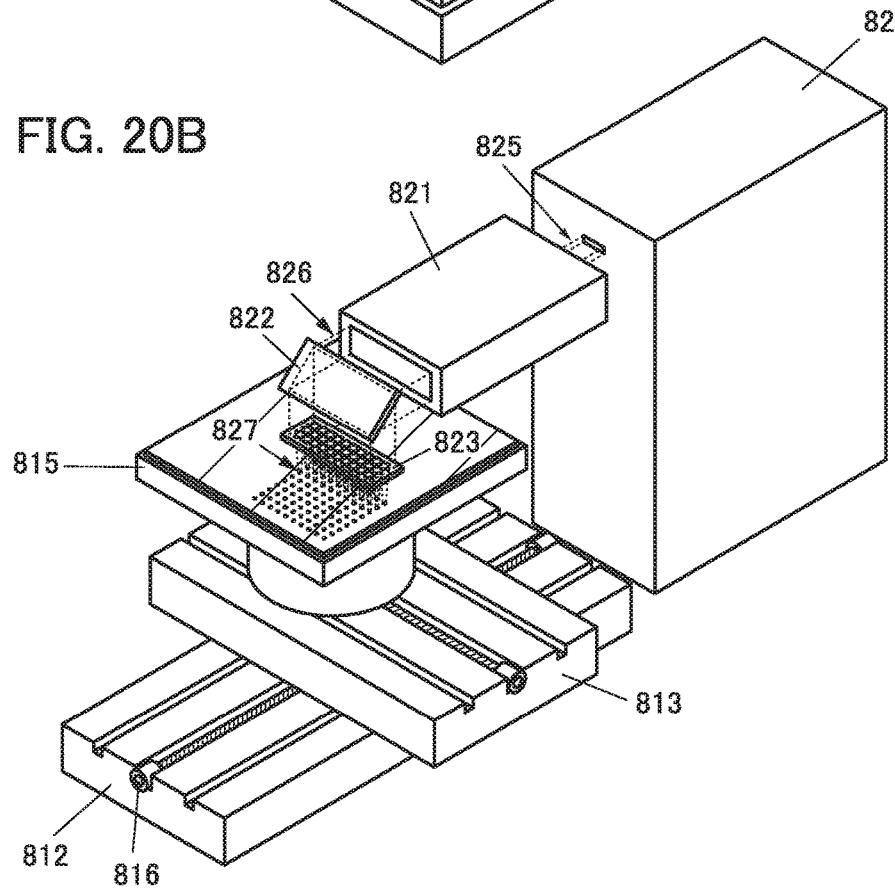

DISPLAY DEVICE COMPRISING FIRST AND SECOND TRANSISTORS WHEREIN GATES OF THE FIRST AND SECOND TRANSISTORS ARE SUPPLIED WITH A SAME SELECTION SIGNAL

TECHNICAL FIELD

One embodiment of the present invention relates to a display device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device refers to any device that can function by utilizing semiconductor characteristics. A transistor, a semiconductor circuit, an arithmetic device, a memory device, and the like are each an embodiment of the semiconductor device. In addition, an imaging device, an electro-optical device, a power generation device (e.g., a thin film solar cell and an organic thin film solar cell), and an electronic device each may include a semiconductor device.

BACKGROUND ART

In recent years, a high-resolution display device has been required. For example, full high-definition (the number of pixels is 1920×1080) has been in the mainstream of home-use television devices (also referred to as televisions or television receivers), while high-resolution display devices such as a 4K (the number of pixels is 3840×2160) display and an 8K (the number of pixels is 7680×4320) display have been developed.

A liquid crystal display device is known as a kind of display devices. A transmissive liquid crystal display device adjusts the amount of light from a backlight to be transmitted and shows contrast to display an image by utilizing optical modulation action of a liquid crystal.

As a kind of field-effect transistors, a thin film transistor whose channel region is formed using a semiconductor film that is formed over a substrate having an insulating surface is known. Patent Document 1 discloses a technique in which amorphous silicon is used for a semiconductor film that is used in a channel region of a thin film transistor. For example, in a liquid crystal display device, a thin film transistor is used as a switching transistor in each pixel.

An active matrix liquid crystal display device, in which a transistor whose channel formation region includes a metal oxide is used as a switching element connected to a pixel electrode, is known (see Patent Document 2 and Patent Document 3).

REFERENCE

Patent Document

[Patent Document 1] Japanese Published Patent Application No. 2001-053283
[Patent Document 2] Japanese Published Patent Application No. 2007-123861
[Patent Document 3] Japanese Published Patent Application No. 2007-096055

DISCLOSURE OF INVENTION

A transistor including amorphous silicon or metal oxide (also referred to as an oxide semiconductor) has advantages over a transistor or the like including polycrystalline silicon in productivity and ease of being formed over a large substrate. On the other hand, the transistor including amorphous silicon or metal oxide has difficulty in having high field-effect mobility as compared with the transistor including polycrystalline silicon. In the case where a load connected to the transistor is heavy, it might be difficult to drive the transistor at a high frequency.

An increase in size of television devices, monitors, digital signage, and the like is demanded. In addition, a higher frame frequency is required for smooth display of moving images. However, the higher the resolution is or the larger the screen size is, the more significant an increase in load becomes, which might make operation at a high frame frequency difficult.

An object of one embodiment of the present invention is to provide a high-resolution display device. An object is to provide a display device that is suitable for increasing in size. An object is to provide a display device with high productivity. An object is to provide a high-resolution display device without dividing a source line and a gate line. An object is to provide a high-resolution display device by including amorphous silicon or the like.

Note that the description of these objects does not disturb the existence of other objects. In one embodiment of the present invention, there is no need to achieve all the objects. Note that other objects can be derived from the description of the specification, the drawings, the claims, and the like.

One embodiment of the present invention is a display device including a first wiring, a second wiring, a third wiring, a fourth wiring, a first transistor, a second transistor, a first conductive layer, and a second conductive layer. The third wiring and the fourth wiring extend in the first direction, are arranged in the second direction intersecting with the first direction, and intersect with the first wiring and the second wiring. The first wiring and the second wiring extend in the second direction and are arranged in the first direction. A gate of the first transistor is electrically connected to the third wiring, one of a source and a drain of the first transistor is electrically connected to the first wiring, and the other of the source and the drain of the first transistor is electrically connected to the first conductive layer. A gate of the second transistor is electrically connected to the fourth wiring, one of a source and a drain of the second transistor is electrically connected to the second wiring, and the other of the source and the drain of the second transistor is electrically connected to the second conductive layer. Each of the first conductive layer and the second conductive layer includes a portion overlapping with part of the second wiring. The first and second wirings are supplied with respective signals, and the third and fourth wirings are supplied with the same selection signal.

It is preferable that the display device of the above embodiment include a liquid crystal, a first coloring layer, and a second coloring layer, that the liquid crystal and the first coloring layer overlap with the first conductive layer, and that the liquid crystal and the second coloring layer overlap with the second conductive layer. In that case, the first coloring layer and the second coloring layer preferably transmit light of the same color.

It is preferable that the display device of the above embodiment further include a fifth wiring, a sixth wiring, a third transistor, a fourth transistor, a third conductive layer, and a fourth conductive layer. In that case, the fifth wiring and the sixth wiring extend in the second direction. A gate of the third transistor is electrically connected to the third wiring, one of a source and a drain of the third transistor is electrically connected to the fifth wiring, and the other of the source and the drain of the third transistor is electrically connected to the third conductive layer. A gate of the fourth transistor is electrically connected to the fourth wiring, one of a source and a drain of the fourth transistor is electrically connected to the sixth wiring, and the other of the source and the drain of the fourth transistor is electrically connected to the fourth conductive layer. Each of the third conductive layer and the fourth conductive layer includes a portion overlapping with part of the sixth wiring. Furthermore, the fifth wiring and the sixth wiring are preferably supplied with respective signals.

It is preferable the display device of the above embodiment include a liquid crystal, a third coloring layer, and a fourth coloring layer, that the liquid crystal and the third coloring layer overlap with the third conductive layer, and that the liquid crystal and the fourth coloring layer overlap with the fourth conductive layer. In that case, it is preferable that the third coloring layer and the fourth coloring layer transmit light of the same color whose color is different from the color of the light transmitted through the first coloring layer.

In the display device of the above embodiment, the fifth wiring is preferably positioned between the second wiring and the sixth wiring. Alternatively, the sixth wiring is preferably positioned between the second wiring and the fifth wiring.

In the display device of the above embodiment, each of the first semiconductor layer of the first transistor and the second semiconductor layer of the second transistor preferably includes a portion positioned between the first wiring and the second wiring.

In the display device of the above embodiment, each of the first semiconductor layer and the second semiconductor layer preferably contains metal oxide.

Alternatively, each of the first semiconductor layer and the second semiconductor layer preferably contains amorphous silicon, microcrystalline silicon, or polycrystalline silicon.

In the display device of the above embodiment, the display device preferably further includes a capacitor electrically connected to the first transistor. In that case, the capacitor is preferably positioned between the first wiring and the second wiring, and further preferably includes a portion overlapping with the first conductive layer.

In the display device of the above embodiment, the capacitor preferably includes a fifth conductive layer and a sixth conductive layer. Each of the fifth conductive layer and the sixth conductive layer is configured to transmit visible light.

According to one embodiment of the present invention, a display device that is suitable for increasing in size can be provided. A display device with high resolution can be provided. A display device with increased productivity can be provided. A display device with high resolution can be provided without dividing a source line and a gate line. A display device with high resolution can be provided using amorphous silicon or the like.

Note that the description of these effects does not preclude the existence of other effects. One embodiment of the present invention does not necessarily achieve all the effects listed above. Other effects can be derived from the description of the specification, the drawings, the claims, and the like.

BRIEF DESCRIPTION OF DRAWINGS

FIG. 5 illustrates a structure example of a display device.
FIGS. 20A and 20B illustrate a laser irradiation method and a laser crystallization apparatus.

BEST MODE FOR CARRYING OUT THE INVENTION

Figure 1:
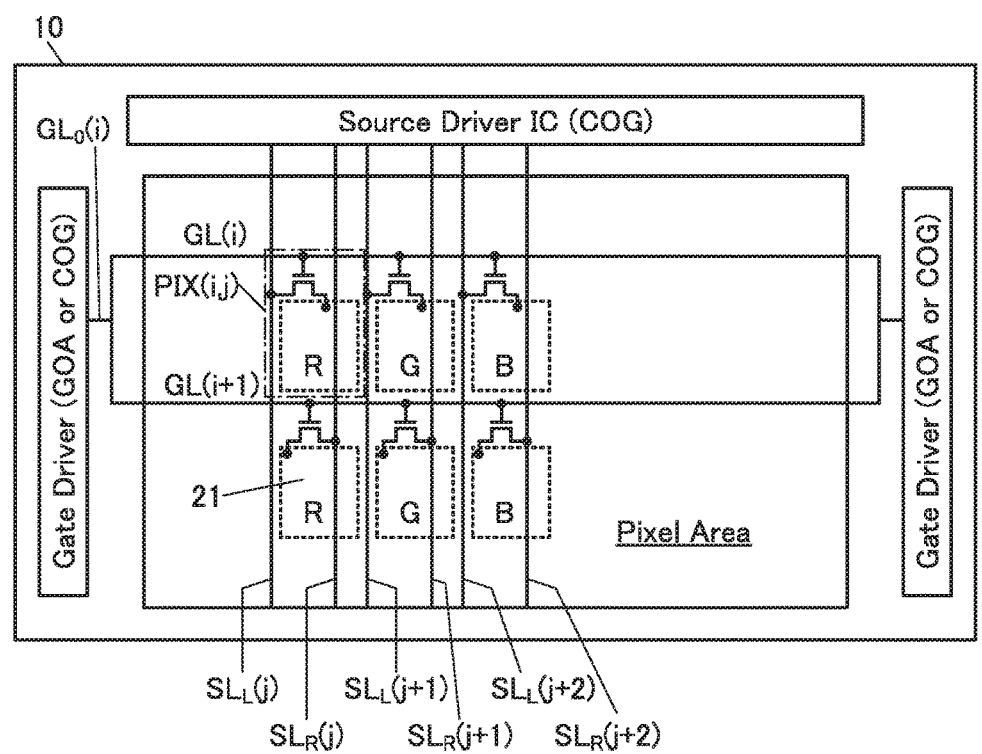
FIG. 1 illustrates a structure example of a display device.

Embodiments will be described in detail with reference to the drawings. Note that the present invention is not limited to the following description. It will be readily understood by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description thereof is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT) in its category.

Furthermore, functions of a source and a drain might be switched when a transistor of opposite polarity is employed or a direction of current flow is changed in circuit operation, for example. Therefore, the terms "source" and "drain" can be switched in this specification.

Note that in this specification and the like, the term "electrically connected" includes the case where components are connected through an object having any electric function. There is no particular limitation on the "object having any electric function" as long as electric signals can be transmitted and received between components that are connected through the object. Examples of an "object having any electric function" are a switching element such as a transistor, a resistor, a coil, a capacitor, and an element with a variety of functions as well as an electrode and a wiring.

In this specification and the like, a display panel as one embodiment of the display device has a function of displaying (outputting) an image or the like on (to) a display surface; hence, the display panel is one embodiment of an output device.

In this specification and the like, a structure in which a connector such as a flexible printed circuit (FPC) or a tape carrier package (TCP) is attached to a substrate of a display panel, or a structure in which an integrated circuit (IC) is mounted on a substrate by a chip on glass (COG) method or the like is referred to as a display panel module or a display module, or simply referred to as a display panel or the like in some cases.

In this specification and the like, a touch sensor has a function of sensing the contact, press, approach, or the like of an object such as a finger or a stylus. In addition, the touch sensor may have a function of sensing the positional information. Therefore, the touch sensor is one embodiment of an input device. For example, the touch sensor can include one or more sensor elements.

In this specification and the like, a substrate provided with a touch sensor is referred to as a touch sensor panel or simply referred to as a touch sensor or the like in some cases. Furthermore, in this specification and the like, a structure in which a connector such as an FPC or a TCP is attached to a substrate of a touch sensor panel, or a structure in which an IC is mounted on a substrate by a COG method or the like is referred to as a touch sensor panel module, a touch sensor module, or a sensor module, or simply referred to as a touch sensor or the like in some cases.

Note that in this specification and the like, a touch panel which is one embodiment of the display device has a function of displaying (outputting) an image or the like on (to) a display surface and a function as a touch sensor capable of sensing contact, press, approach, or the like of an object such as a finger or a stylus on or to the display surface. Therefore, the touch panel is an embodiment of an input/output device.

A touch panel can be referred to, for example, a display panel (or a display device) with a touch sensor or a display panel (or a display device) having a touch sensor function.

A touch panel can include a display panel and a touch sensor panel. Alternatively, a touch panel can have a function of a touch sensor inside a display panel or on a surface of the display panel.

In this specification and the like, a structure in which a connector such as an FPC or a TCP is attached to a substrate of a touch panel, or a structure in which an IC is mounted on a substrate by a COG method or the like is referred to as a touch panel module or a display module, or simply referred to as a touch panel or the like in some cases.

Embodiment 1

In this embodiment, a display device of one embodiment of the present invention is described.

One embodiment of the present invention is a display device including a display region (also referred to as a pixel portion) where a plurality of pixels are arranged in a matrix. In the pixel portion, a plurality of wirings to which a selection signal is supplied (also referred to as gate lines or scan lines) and a plurality of wirings to which a signal written to a pixel (also referred to as a video signal or the like) is supplied (also referred to as source lines, signal lines, data lines, or the like) are provided. The gate lines are provided parallel to one another and the source lines are provided parallel to one another. The gate lines and the source lines intersect with each other.

One pixel includes at least one transistor and one display element. The display element includes a conductive layer that functions as a pixel electrode. The conductive layer is electrically connected to one of a source and a drain of the transistor. A gate of the transistor is electrically connected to a gate line. The other of the source and the drain is electrically connected to a source line.

Here, a direction in which the gate lines extend is called a row direction or a first direction, and a direction in which the source lines extend is called a column direction or a second direction.

The same selection signal is preferably supplied to two adjacent gate lines. That is, selection periods of these gate lines are preferably the same. In particular, two gate lines are preferably regarded as a group, in which case the configuration of a driver circuit can be simplified.

In the case where the same selection signal is supplied to two gate lines, two pixels which are adjacent to each other in the column direction are concurrently selected. Thus, different source lines are connected to the two pixels. That is, two source lines are arranged for each column.

Here, one of the two source lines is preferably disposed to overlap with the conductive layer functioning as a pixel electrode. The other source line is preferably disposed not to overlap with the pixel electrode. Thus, the two source lines can be apart from each other without changing the definition, which leads to a reduction in parasitic capacitance therebetween.

In particular, increasing the distance between two wirings extending parallel to each other is extremely effective because the wirings are long in a large display device. Furthermore, since one source line is disposed between two pixel electrodes, the distance between the two pixel electrodes adjacent in the row direction can be reduced.

Moreover, part of a semiconductor layer of a transistor is preferably provided between two source lines connected to pixels in the same column. Thus, a structure in which a node between each source line and each semiconductor layer does not intersect with another source line can be employed. For that reason, parasitic capacitance between the source lines can be reduced.

With such a configuration, one horizontal period can be longer than the conventional one. For example, in the case where the same selection signal is supplied to two gate lines, the length of one horizontal period can be two times the length of the conventional one. Furthermore, since the parasitic capacitance between the source lines can be reduced, the load of the source lines can be reduced. Thus, even a significantly high-resolution display device such as a 4K display or an 8K display can be operated with use of a transistor with low field-effect mobility. The above-described configurations can be applied to a large display device with a diagonal screen size of 50 inches or larger, 60 inches or larger, or 70 inches or larger.

In a transistor in each pixel, metal oxide (an oxide semiconductor) is preferably used for a semiconductor layer where a channel is formed. The transistor including metal oxide can have higher field-effect mobility and thus can have a smaller transistor size (the area occupied by a transistor) than a transistor including amorphous silicon. Accordingly, parasitic capacitance of the source lines and the gate lines can be small.

In the case where a material that is less likely to increase the field-effect mobility, e.g., amorphous silicon, is used as a semiconductor material for a semiconductor layer of a transistor, by reducing the electric resistance and capacitance of each source line as small as possible, driving at a higher frame frequency, a larger display device, and the like can be achieved. Examples of methods of reducing the electric resistance and capacitance include using a low resistance material (e.g., copper or aluminum) as a material of the source line, making the thickness or width of the source line large, making the thickness of an interlayer insulating film between the source line and another wiring large, and making the intersecting area of the source line and another wiring small.

A more specific example of the display device is described below with reference to drawings.

[Structure Example of Display Device]

FIG. 1 is a block diagram of a display device 10 of one embodiment of the present invention. The display device 10 includes a pixel region (a display region), a source driver, and a gate driver.

FIG. 1 illustrates an example in which the display device 10 includes two gate drivers with a pixel region sandwiched therebetween. A plurality of gate lines $GL_0$ are connected to the two gate drivers. In FIG. 1, an i-th gate line $GL_0(i)$ is illustrated. The gate line $GL_0(i)$ is electrically connected to two gate lines (a gate line GL(i) and a gate line GL(i+1)). Accordingly, the same selection signal is supplied to the two gate lines.

A plurality of source lines are connected to the source driver. Two source lines are provided for one pixel column. FIG. 1 illustrates two source lines (a source line $SL_L(j)$ and a source line $SL_R(j)$) for the j-th pixel column, two source lines (a source line $SL_L(j+1)$ and a source line $SL_R(j+1)$) for the (j+1)-th pixel column, and two source lines (a source line $SL_L(j+2)$ and a source line $SL_R(j+2)$) for the (j+2)-th pixel column.

One pixel PIX includes at least one transistor and one conductive layer 21 that functions as a pixel electrode of a display element. The pixel PIX corresponds to one color. In the case where color display is performed by utilizing mixture of light emitted from a plurality of pixels, the pixel PIX can be called a subpixel.

Furthermore, pixels arranged in one column in the column direction preferably emit light of the same color. In the case where a liquid crystal element is used as a display element, the pixels arranged in one column in the column direction are provided with coloring layers that transmit light of the same color to overlap with the liquid crystal elements.

Here, for example, pixels in the j-th pixel column emit light of a red color, pixels in the j+1-th pixel column emit light of a green color, and pixels in the j+2-th pixel column emit light of a blue color. In FIG. 1, the pixels are marked with R, G, and B for clarification.

Here, one of two source lines corresponding to one pixel column preferably overlaps with the conductive layer 21. FIG. 1 shows an example where the source line $SL_R(j)$ and the like on the right side overlap with the conductive layer 21. In addition, the source line overlapping with the conductive layer 21 is preferably disposed in the vicinity of the center portion of the conductive layer 21. For example, source lines are preferably arranged so that the distance between the source line $SL_L(j)$ and the source line $SL_R(j)$ is equivalent to the distance between the source line $SL_R(j)$ and the source line $SL_L(j+1)$ connected to an adjacent pixel column. That is, when the source lines are arranged at appropriately regular intervals, parasitic capacitance between the source lines can be reduced, so that a load per source line can be reduced.

As a method for achieving high resolution with use of a transistor including amorphous silicon or the like which has difficulty in having high field-effect mobility, there is a method in which a display region of a display device is divided into a plurality of pixel regions and driven. In this driving method, for example, at least one of the source line and the gate line is divided. In the above method, a boundary portion between divided pixel regions might be visually recognized owing to variations in characteristics of a driver circuit, which decreases the visibility in some cases. In addition, image processing or the like for dividing in advance image data to be input is necessary; thus, a large-scale image processing device that can operate at a high speed is required.

In contrast, the display device of one embodiment of the present invention can be driven without dividing the display region even when including a transistor with relatively low field-effect mobility.

In particular, the use of a transistor including an oxide semiconductor provides various effects described below. For example, the transistor size (the area occupied by a transistor) can be small; thus, parasitic capacitance of the transistor itself can be small. Moreover, the aperture ratio can be improved, or the wiring width can be widened and wiring resistance can be low without reducing the aperture ratio as compared with a transistor including amorphous silicon. Furthermore, since the transistor including an oxide semiconductor can have a high on-state current, the period for writing to a pixel can be shortened. Owing to these effects, charge and discharge periods of the gate line and the source line can be shortened and the frame frequency can be increased.

Furthermore, since the transistor including an oxide semiconductor can have a significantly lower off-state current than a transistor including silicon has, the holding period of a potential applied to a pixel can be prolonged and the frame frequency can be reduced. For example, the frame frequency can be variable in a range from 0.1 Hz to 480 Hz inclusive. In a television device or the like, the frame frequency is preferably 30 Hz or higher and 240 Hz or lower, more preferably 60 Hz or higher and 120 Hz or lower.

Another effect from the use of a transistor having a significantly low off-state current is a reduction in storage capacitor of a pixel. This can increase the aperture ratio of a pixel and shorten the period for writing to a pixel.

Although FIG. 1 illustrates an example in which a source driver is disposed along a side of a pixel region, source drivers may be disposed along facing two sides of the pixel region such that the pixel region is sandwiched between the source drivers.

Figure 2A:
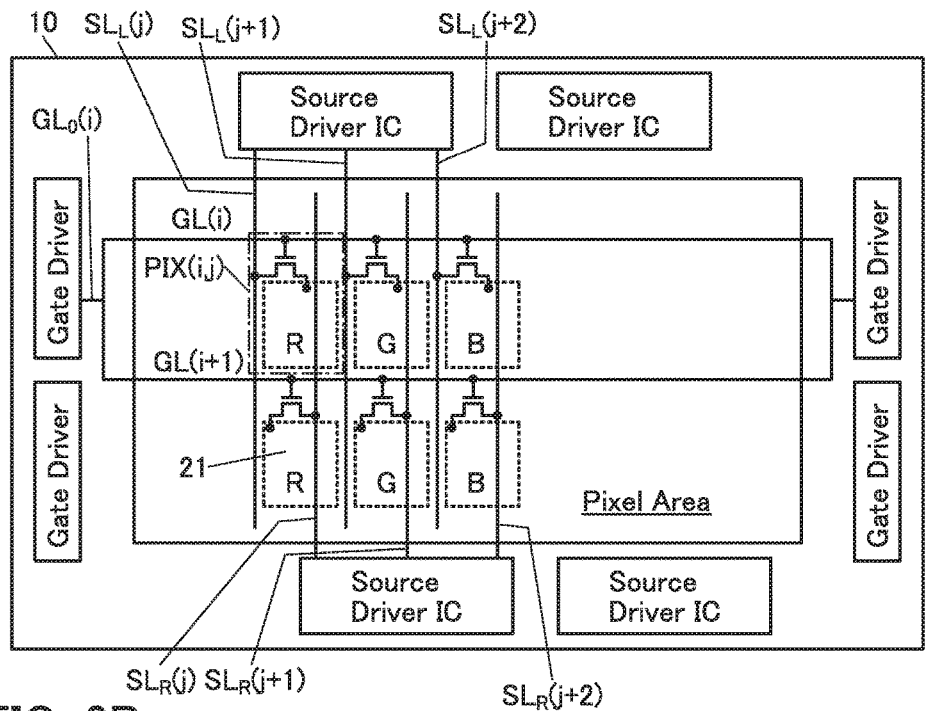
FIGS. 2A and 2B illustrate structure examples of a display device.

FIG. 2A shows an example where among two source lines for one pixel column, a source driver IC connected to the source line $SL_L(j)$ and the like positioned on the left side and a source driver IC connected to the source line $SL_R(j)$ and the like positioned on the right side are disposed to face each other. With such a configuration, display unevenness due to a potential drop caused by wiring resistance can be suppressed even in a large display device. In the configuration of FIG. 2A, the number of source driver ICs disposed along one side of the pixel region can be half of that in the configuration of FIG. 1; accordingly, the area of one source driver IC can be large. Thus, the distance between two adjacent source driver ICs can be large, improving the manufacturing yield.

Figure 2B:
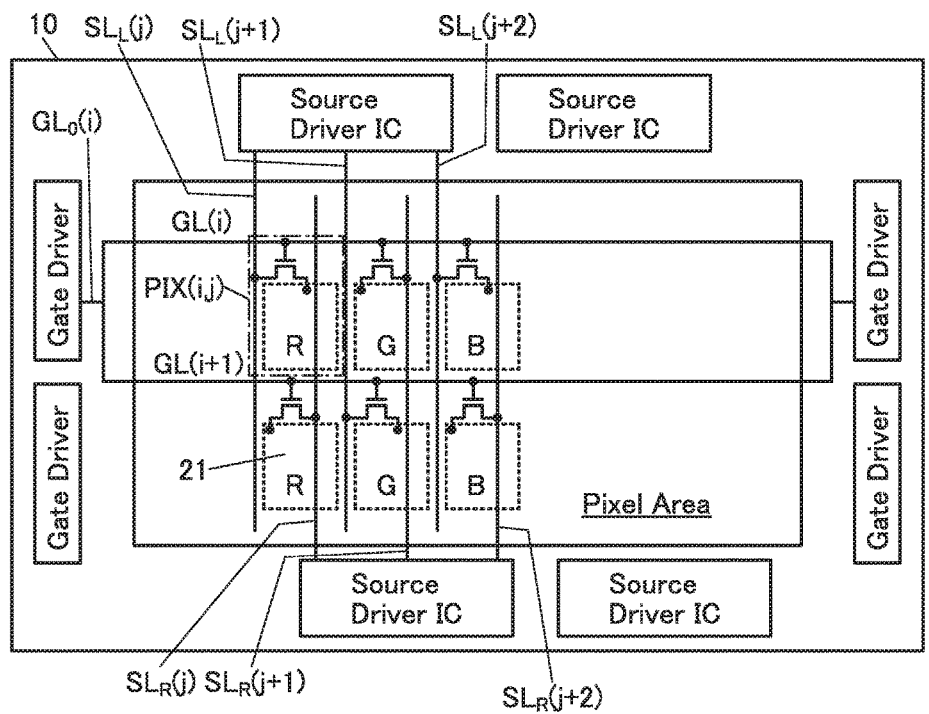

FIG. 2B illustrates an example where connection of transistors is different from that in FIG. 2A. In FIG. 2B, of a plurality of transistors connected to one gate line, transistors connected to a source line on the left side and transistors connected to a source line on the right side are alternately arranged.

In FIG. 2A, a plurality of pixels connected to the same gate line are driven by one of a pair of source driver ICs. Thus, a row driven by the source driver IC on the upper side and a row driven by the source driver IC on the lower side are alternately arranged in the column direction, and display unevenness due to variation in characteristics of the source driver ICs and the like can be reduced.

Meanwhile, in FIG. 2B, the source driver IC on the upper side and the source driver IC on the lower side drive a plurality of pixels connected to the same gate line alternately. Thus, pixels driven by the source driver IC on the upper side and pixels driven by the source driver IC on the lower side are alternately arranged in the row direction and the column direction. Consequently, display unevenness due to variation in characteristics of the source driver ICs and the like can be effectively reduced.

[Pixel Configuration Example]

An example of the configuration of a pixel disposed in a pixel region of the display device 10 is described below.

Figure 3A:
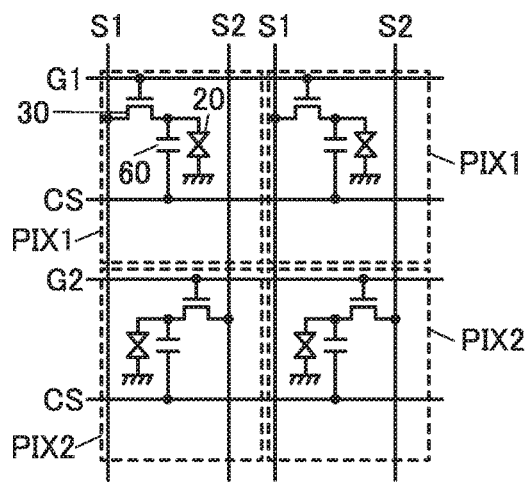
FIGS. 3A to 3D illustrate structure examples of a display device.

FIG. 3A is a circuit diagram including four pixels arranged in the row direction and the column direction.

Each pixel includes a transistor 30, a liquid crystal element 20, and a capacitor 60.

Wirings S1 and S2 are source lines, and wirings G1 and G2 are gate lines. A wiring CS is electrically connected to one electrode of the capacitor 60, and a certain potential is applied to the wiring CS.

The pixel is electrically connected to either of the wirings S1 and S2 and either of the wirings G1 and G2. In FIG. 3A, the pixel connected to the wiring S1 is referred to as a pixel PIX1, and the pixel connected to the wiring S2 is referred to as a pixel PIX2.

The pixel PIX1 is described as an example. In the transistor 30, a gate is electrically connected to the wiring G1, one of a source and a drain is electrically connected to the wiring S1, and the other of the source and the drain is electrically connected to the other electrode of the capacitor 60 and one electrode (pixel electrode) of the liquid crystal element 20. A common potential is supplied to the other electrode of the capacitor 60.

Figure 3B:
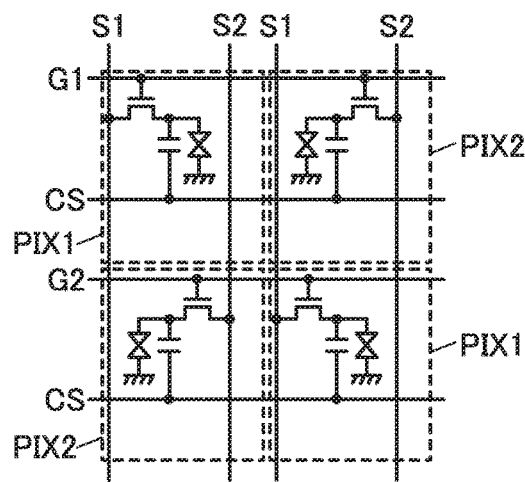

In the configuration illustrated in FIG. 3A, pixels having the same configuration are arranged in one row in the row direction, and pixels having a configuration and pixels having another configuration are alternately arranged in one column in the column direction. Meanwhile, as illustrated in FIG. 3B, pixels having a configuration and pixels having another configuration may be alternately arranged not only in the column direction but also in the row direction.

Figure 3C:
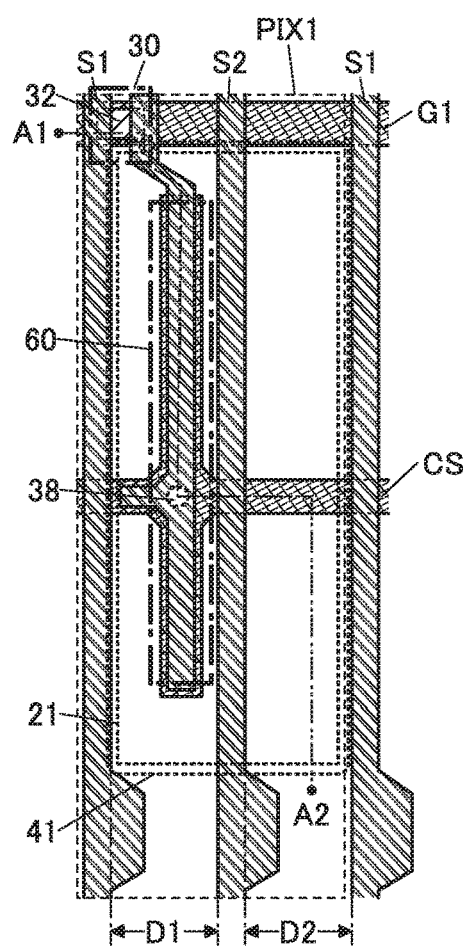

FIG. 3C illustrates an example of a layout of the pixel PIX1 connected to the wiring S1 and the wiring G1.

As illustrated in FIG. 3C, the wiring G1 and the wiring CS extend in the row direction (the lateral direction), and the wirings S1 and S2 extend in the column direction (the longitudinal direction).

In the transistor 30, a semiconductor layer 32 is provided over the wiring G1, and part of the wiring G1 functions as a gate electrode. Part of the wiring S1 functions as one of a source electrode and a drain electrode. The semiconductor layer 32 includes a region positioned between the wiring S1 and the wiring S2.

The other of the source electrode and the drain electrode of the transistor 30 is electrically connected to the conductive layer 21 that functions as a pixel electrode through a connection portion 38. A coloring layer 41 is provided in a position overlapping with the conductive layer 21.

The conductive layer 21 includes a portion overlapping with the wiring S2. It is preferable that the conductive layer 21 not overlap with the wiring S1. Thus, parasitic capacitance of the wiring S1 can be reduced.

Here, when the distance between the wiring S1 and the wiring S2 in the same pixel column is referred to as a distance D1 and the distance between the wiring S2 and the wiring S1 connected to an adjacent pixel is referred to as a distance D2, the distance D1 and the distance D2 are preferably substantially the same. For example, the ratio of the distance D2 to the distance D1 (i.e., the value of D2/D1) is greater than or equal to 0.8 and less than or equal to 1.2, preferably greater than or equal to 0.9 and less than or equal to 1.1. Thus, parasitic capacitance between the wiring S1 and the wiring S2 can be reduced.

Owing to a wide distance between wirings, dust or the like that adheres between the wirings in the manufacturing process is easily removed by washing, improving the yield. When the washing is performed with a line washing apparatus, it is preferable that during the washing, a substrate be moved along the direction in which the wiring S1 and the like extend, in which case dust can be removed more easily.

In FIG. 3C, the wiring S1 and the wiring S2 each include a wider portion than the other portion. Thus, the wiring resistance can be small.

Figure 3D:
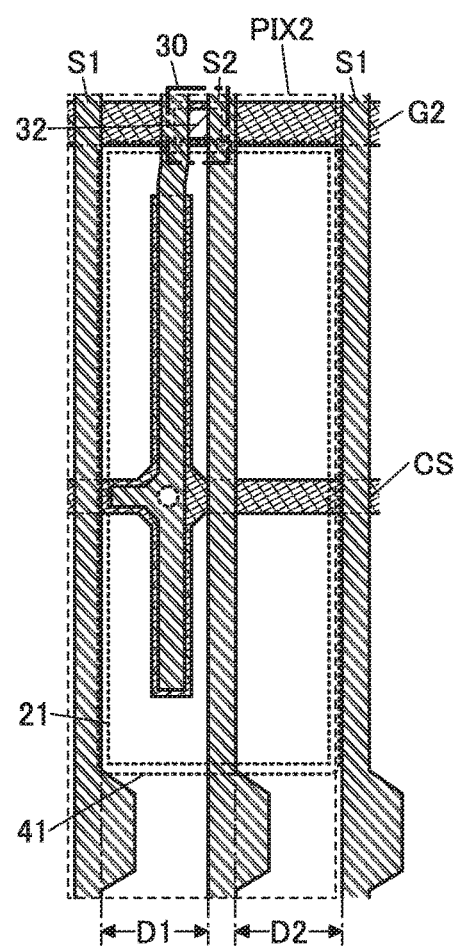

FIG. 3D illustrates an example of a layout of the pixel PIX2 connected to the wiring S2. Here, an example where the pixel PIX2 is connected to the wiring S2 and the wiring G2 is shown.

In FIG. 3D, the semiconductor layer 32 provided over the wiring G2 is electrically connected to the wiring S2, and has a region positioned between the wiring S1 and the wiring S2.

In the pixels illustrated in each of FIGS. 3C and 3D, the pixels arranged in one column in the column direction preferably emit light of the same color and the pixels adjacent in the row direction preferably emit light of different colors. In the two pixels arranged in one column in the column direction, the coloring layer 41 that transmits light of the same color can be provided in a region overlapping with the conductive layers 21 of the two pixels. Meanwhile, in the two pixels adjacent in the row direction, the coloring layers 41 that transmit light of different colors are provided in a region overlapping with the conductive layers 21 of the two pixels.

Modification Example 1

Here, with use of a light-transmitting material for the pair of electrodes of the capacitor 60, the aperture ratio of a pixel (an effective transmission area ratio) can be increased.

Figure 4A:
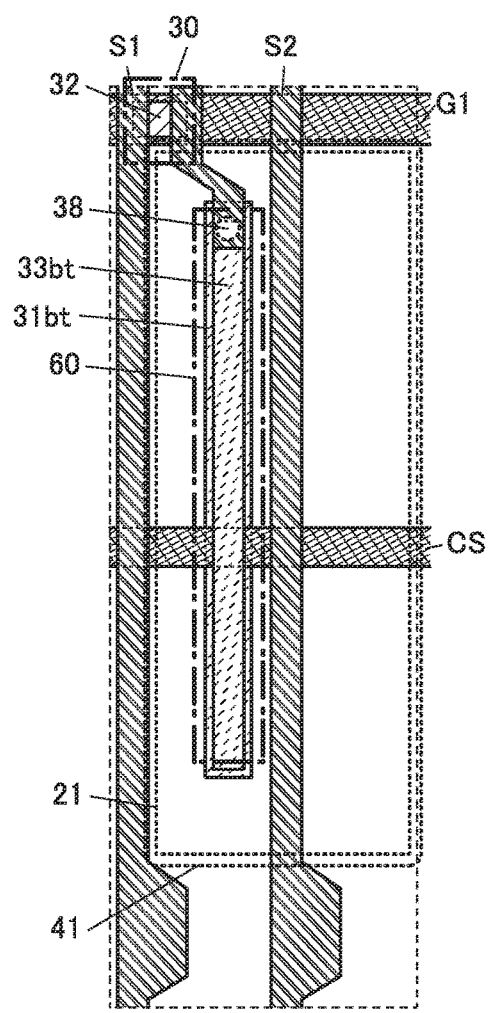
FIGS. 4A to 4D illustrate structure examples of a display device.

FIG. 4A illustrates an example in which a conductive layer 31bt and a conductive layer 33bt are used for the pair of electrodes of the capacitor 60. The conductive layer 31bt and the conductive layer 33bt contain a material that transmits visible light. The conductive layer 31bt is electrically connected to the wiring CS. The conductive layer 33bt is electrically connected to the other of the source electrode and the drain electrode of the transistor 30 and the conductive layer 21 that functions as a pixel electrode.

Figure 4B:
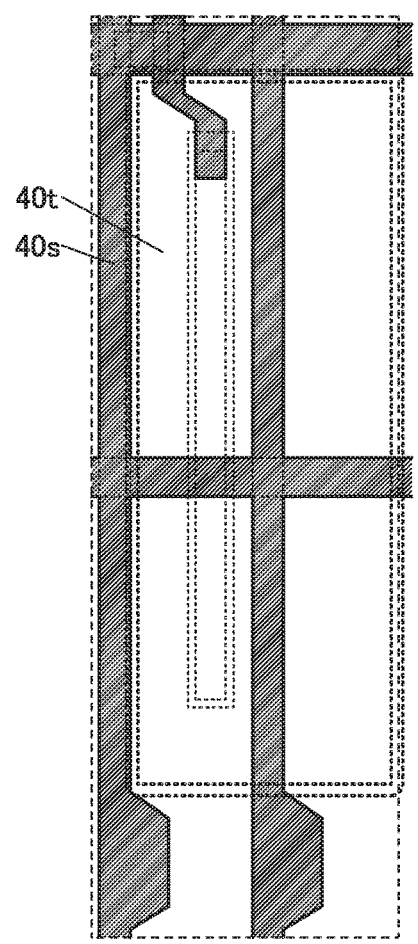

FIG. 4B illustrates an example in which the layout illustrated in FIG. 4A is separately shown as a light-blocking region 40s that blocks visible light and a transmissive region 40t that transmits visible light. As illustrated, a region where the capacitor 60 is provided can be used as the transmissive region 40t, whereby the aperture ratio can be improved and the power consumption can be reduced.

Figure 4C:
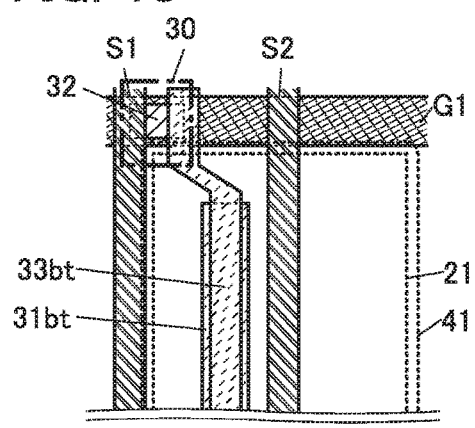

FIG. 4C illustrates an example in which part of the conductive layer 33bt included in the capacitor 60 serves as the other of the source electrode and the drain electrode of the transistor 30. That is, the part of the conductive layer 33bt overlaps with and is electrically connected to part of the semiconductor layer 32.

Figure 4D:
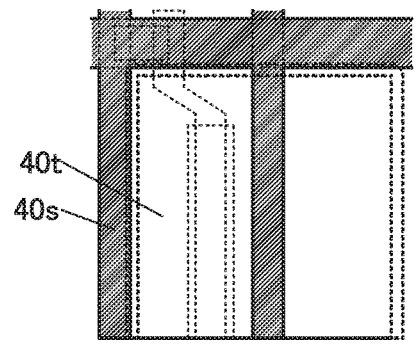

Thus, as illustrated in FIG. 4D, the area of the transmissive region 40t can be increased. In FIG. 4D, components of the light-blocking region 40s are only the wirings S1 to S4, the wiring G1 and the like, and the wiring CS. Accordingly, the top surface shape of the transmissive region 40t can be substantially symmetrical. Thus, display regions in the two kinds of pixels arranged in one column in the column direction can have substantially the same shapes, which can suppress generation of display unevenness.

The higher the proportion of the area of the transmissive region 40t to the area occupied by a pixel is, the larger the amount of transmission light can be. The proportion of the area of the transmissive region to the area occupied by a pixel is, for example, greater than or equal to 1% and less than or equal to 95%, preferably greater than or equal to 10% and less than or equal to 95%, more preferably greater than or equal to 15% and less than or equal to 95%. It is particularly preferable that the proportion be greater than or equal to 30% or greater than or equal to 50%. Thus, a display device with low power consumption can be provided. Note that the area occupied by a pixel can be obtained by dividing the pixel region by the total number of pixels, for example.

Modification Example 2

FIG. 5 illustrates an example in which the shape of the transistor 30 is different from the above. In the transistor 30 illustrated in FIG. 5, one of a source electrode and a drain electrode over the semiconductor layer 32 has a substantially arc shape, and the other of the source electrode and the drain electrode over the semiconductor layer 32 is provided at a certain distance from the arc-shape electrode. With such a structure, the transistor 30 can have a larger channel width and make a larger amount of current flow. The transistor 30 with such a structure is suitable particularly in the case where amorphous silicon or the like is used for the semiconductor layer 32, for example.

Cross-Sectional Structure Example 1

A cross-sectional structure example of a display device is shown below.

Cross-Sectional Structure Example 1-1

Figure 6:
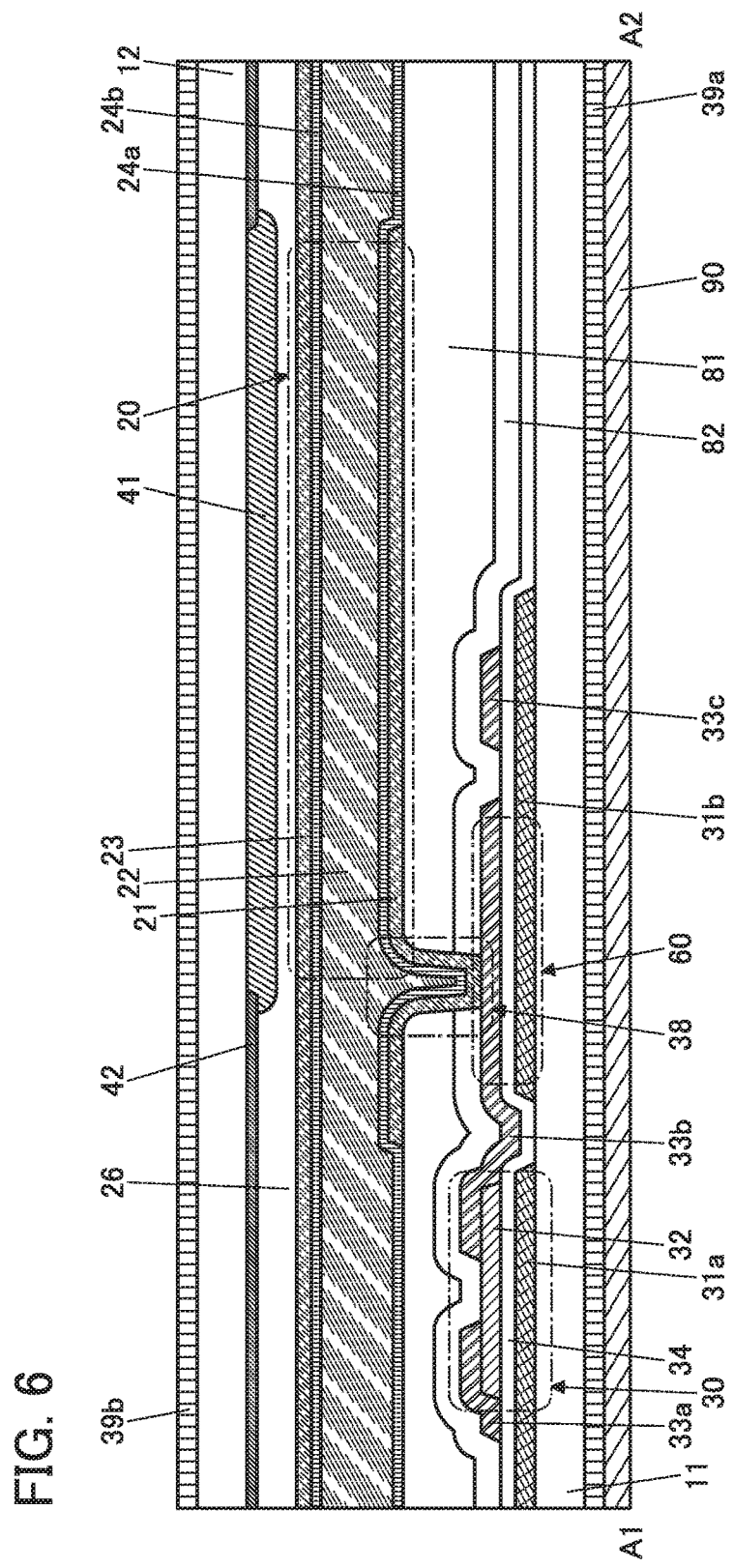
FIG. 6 illustrates a structure example of a display device.

FIG. 6 illustrates an example of a cross section along a line A1-A2 in FIG. 3B. Here, an example where a transmissive liquid crystal element 20 is used as a display element is shown. In FIG. 6, the substrate 12 side is the display surface side.

In the display device 10, a liquid crystal 22 is provided between a substrate 11 and the substrate 12. The liquid crystal element 20 includes the conductive layer 21 provided on the substrate 11 side, a conductive layer 23 provided on the substrate 12 side, and the liquid crystal 22 provided between the conductive layers 21 and 23. Furthermore, an alignment film 24a is provided between the liquid crystal 22 and the conductive layer 21 and an alignment film 24b is provided between the liquid crystal 22 and the conductive layer 23.

The conductive layer 21 functions as a pixel electrode. The conductive layer 23 functions as a common electrode or the like. The conductive layer 21 and the conductive layer 23 each have a function of transmitting visible light. Thus, the liquid crystal element 20 is a transmissive liquid crystal element.

The coloring layer 41 and a light-blocking layer 42 are provided on a surface of the substrate 12 on the substrate 11 side. An insulating layer 26 is provided to cover the coloring layer 41 and the light-blocking layer 42, and the conductive layer 23 is provided to cover the insulating layer 26. The coloring layer 41 is provided in a region overlapping with the conductive layer 21. The light-blocking layer 42 is provided to cover the transistor 30 and the connection portion 38.

A polarizing plate 39a is located outward from the substrate 11, and a polarizing plate 39b is located outward from the substrate 12. Furthermore, a backlight unit 90 is located outward from the polarizing plate 39a.

The transistor 30, the capacitor 60, and the like are provided over the substrate 11. The transistor 30 functions as a selection transistor of a pixel. The transistor 30 is electrically connected to the liquid crystal element 20 through the connection portion 38.

The transistor 30 illustrated in FIG. 6 is what is called a channel-etched bottom-gate transistor. The transistor 30 includes a conductive layer 31a functioning as a gate electrode, an insulating layer 34 functioning as a gate insulating layer, the semiconductor layer 32, and a pair of conductive layers 33a and 33b functioning as a source electrode and a drain electrode. A region of the semiconductor layer 32 overlapping with the conductive layer 31a functions as a channel formation region. The semiconductor layer 32 is in contact with the conductive layer 33a or 33b.

Note that the conductive layer 31a corresponds to part of the wiring G1 in FIG. 3C, and the conductive layer 33a corresponds to part of the wiring S1. Furthermore, a conductive layer 31b and a conductive layer 33c which are described later correspond to the wiring CS and the wiring S2, respectively.

A metal oxide having semiconductor characteristics (also referred to as an oxide semiconductor) is preferably used for the semiconductor layer 32. A transistor including an oxide semiconductor does not need a crystallization step which is necessary in a transistor including polycrystalline silicon, and can be formed over a large substrate with a high yield. Furthermore, a transistor including an oxide semiconductor can have higher field-effect mobility than a transistor including amorphous silicon.

The capacitor 60 includes the conductive layer 31b, the insulating layer 34, and the conductive layer 33b. Furthermore, the conductive layer 33c is provided over the conductive layer 31b with the insulating layer 34 provided therebetween.

An insulating layer 82 and an insulating layer 81 are stacked to cover the transistor 30 and the like. The conductive layer 21 functioning as a pixel electrode is provided over the insulating layer 81. In the connection portion 38, the conductive layer 21 is electrically connected to the conductive layer 33b through an opening in the insulating layers 81 and 82. The insulating layer 81 preferably functions as a planarization layer. The insulating layer 82 preferably functions as a protective film that inhibits diffusion of impurities or the like to the transistor 30 and the like. The insulating layer 82 can be formed using an inorganic insulating material, and the insulating layer 81 can be formed using an organic insulating material, for example.

Cross-Sectional Structure Example 1-2

Figure 7:
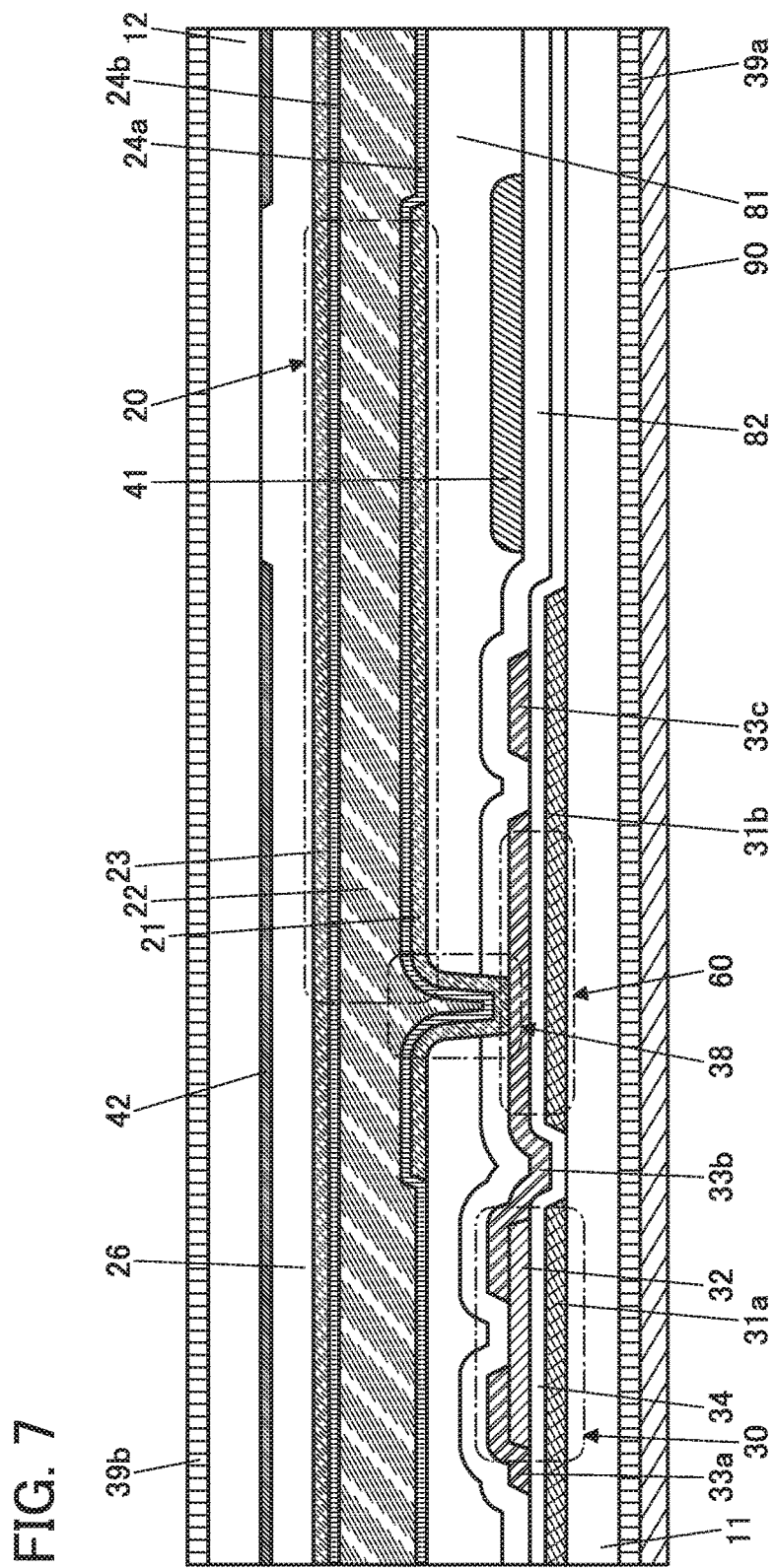
FIG. 7 illustrates a structure example of a display device.

FIG. 7 illustrates an example where the coloring layer 41 is provided on the substrate 11 side. Thus, the structure on the substrate 12 side can be simplified.

Note that in the case where the coloring layer 41 is a planarization film, the insulating layer 81 is not necessarily provided.

Cross-Sectional Structure Example 1-3

In each of the above examples, a vertical electric field mode liquid crystal element in which a pair of electrodes are provided over and under a liquid crystal is used as the liquid crystal element: the structure of the liquid crystal element is not limited thereto and any of a variety of liquid crystal elements can be used.

Figure 8:
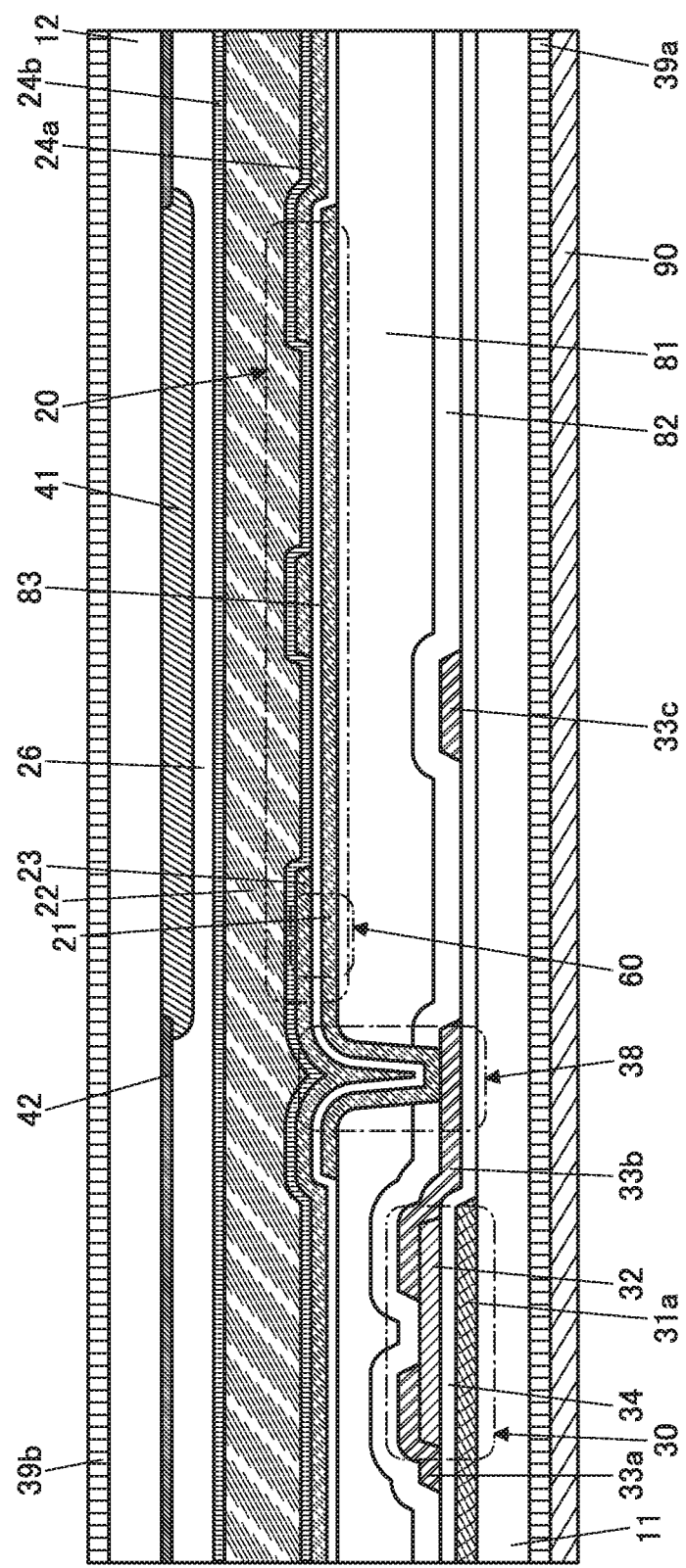
FIG. 8 illustrates a structure example of a display device.

FIG. 8 is a schematic cross-sectional view of a display device including a liquid crystal element using a fringe field switching (FFS) mode.

The liquid crystal element 20 includes the conductive layer 21 functioning as a pixel electrode and the conductive layer 23 overlapping with the conductive layer 21 with an insulating layer 83 provided therebetween. The conductive layer 23 has a slit-like or comb-like top surface.

In such a structure, a capacitor, which can be used as the capacitor 60, is formed in a region where the conductive layer 21 and the conductive layer 23 overlap with each other. Thus, the area occupied by a pixel can be reduced, leading to a high-resolution display device. Accordingly, the aperture ratio can be improved.

Figure 9:
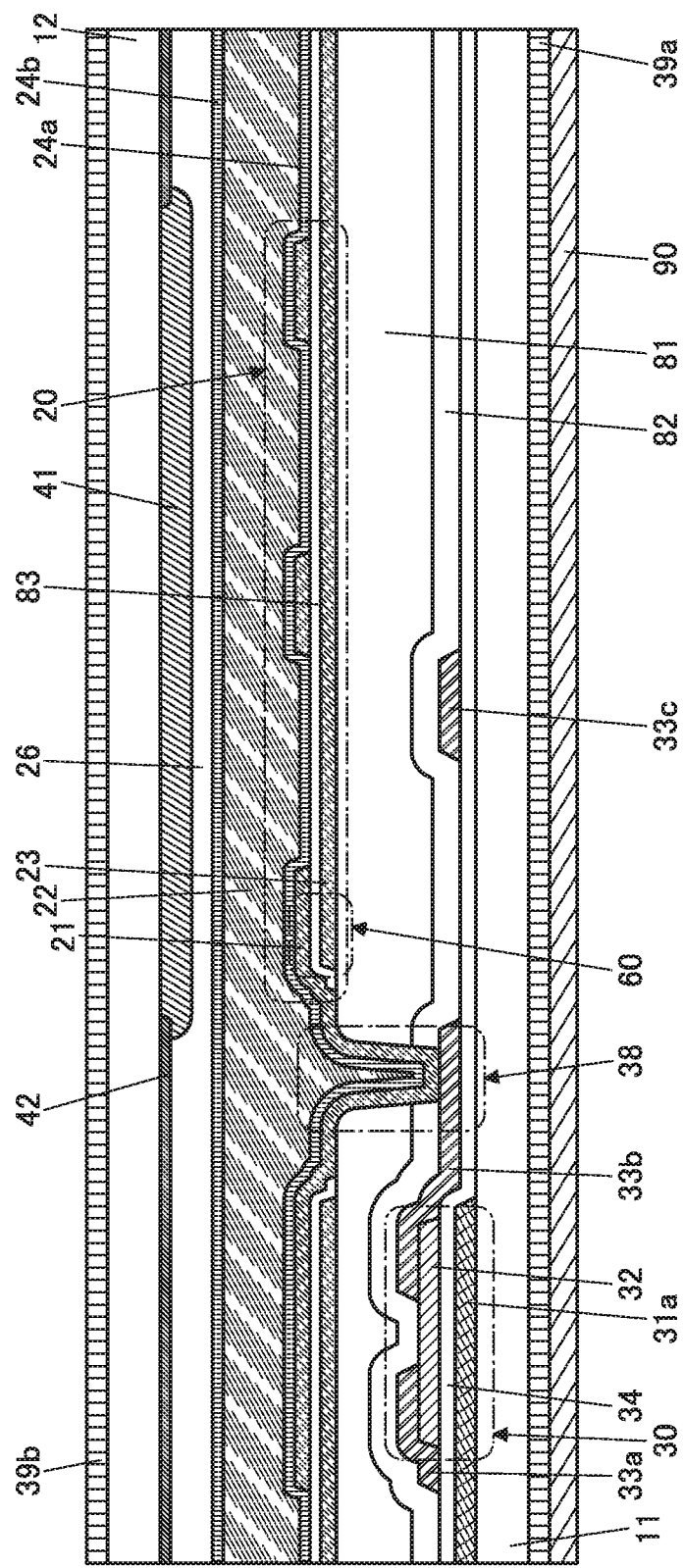
FIG. 9 illustrates a structure example of a display device.

Although FIG. 8 illustrates the structure in which the conductive layer 23 functioning as a common electrode is on the liquid crystal 22 side, a structure in which the conductive layer 21 functioning as a pixel electrode is on the liquid crystal 22 side may be employed as illustrated in FIG. 9. In such a structure, the conductive layer 21 has a slit-like or comb-like top surface.

Cross-Sectional Structure Example 1-4

An example where a light-transmitting conductive film is used for the capacitor 60 or the like is described below.

Figure 10:
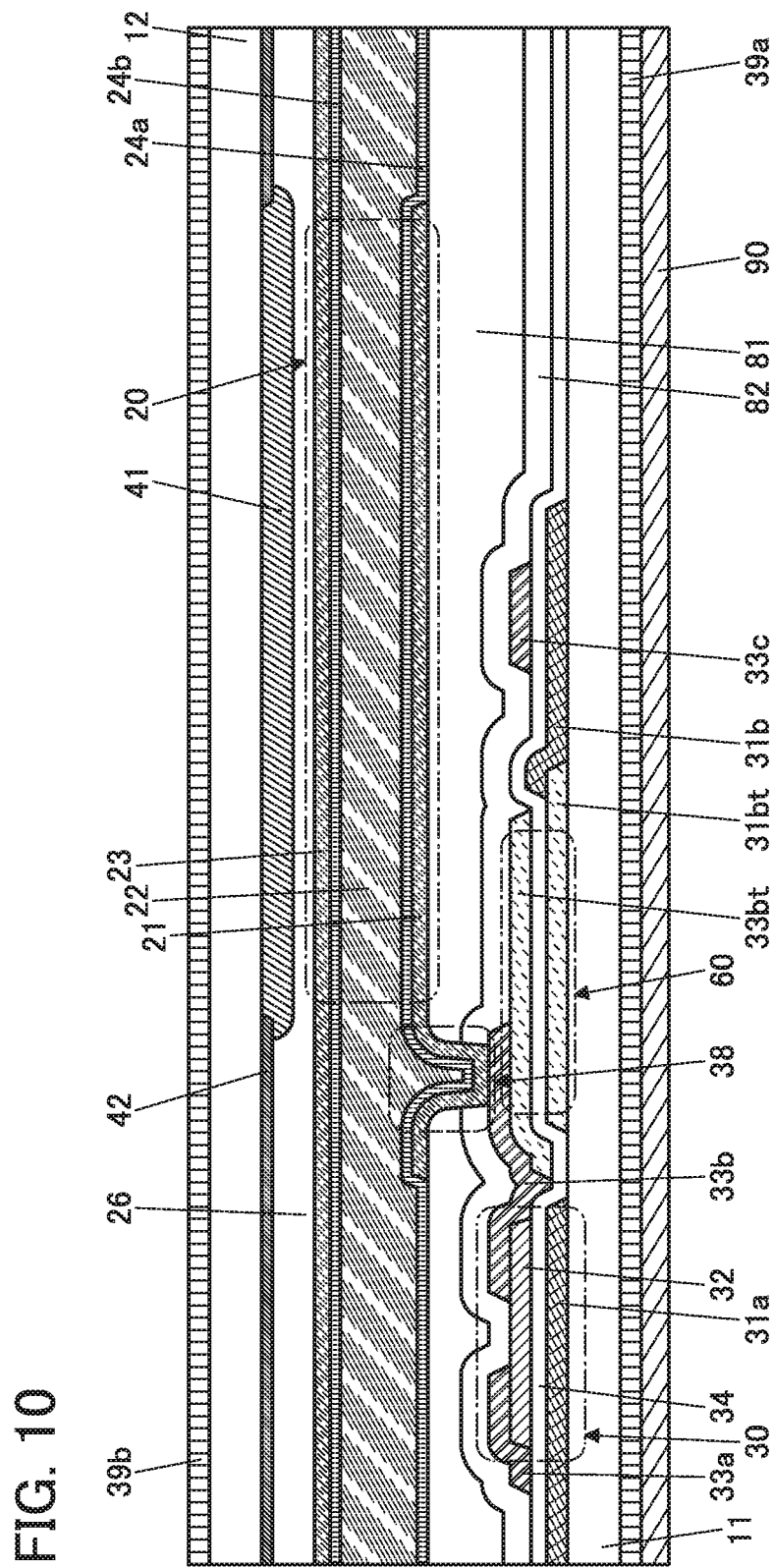
FIG. 10 illustrates a structure example of a display device.

A structure illustrated in FIG. 10 is mainly different from the structure illustrated in FIG. 6 in the structure of the capacitor 60. The structure illustrated in FIG. 10 is a cross section corresponding to the layout illustrated in FIG. 4A.

The capacitor 60 includes a structure where a conductive layer 31bt, the insulating layer 34, and a conductive layer 33bt are stacked in this order from the substrate 11 side. The conductive layer 31bt and the conductive layer 33bt each include a light-transmitting conductive material. For example, a metal oxide film with transmittance of visible light of greater than or equal to 70% and less than 100%, preferably greater than or equal to 80% and less than 100% can be used.

Part of the conductive layer 31bt is in contact with and electrically connected to the conductive layer 31b. Part of the conductive layer 33bt is in contact with and electrically connected to the conductive layer 33b.

Here, in the case where a metal oxide film and a metal film are stacked, when the metal oxide film is formed over the metal film, a surface of the metal film is oxidized; thus, electrical resistance of the metal film itself or contact resistance between the metal film and the metal oxide film is increased in some cases. For that reason, as illustrated in FIG. 10, a conductive layer including metal or the like is preferably provided over a conductive layer including a metal oxide.

Cross-Sectional Structure Example 1-5

Figure 11:
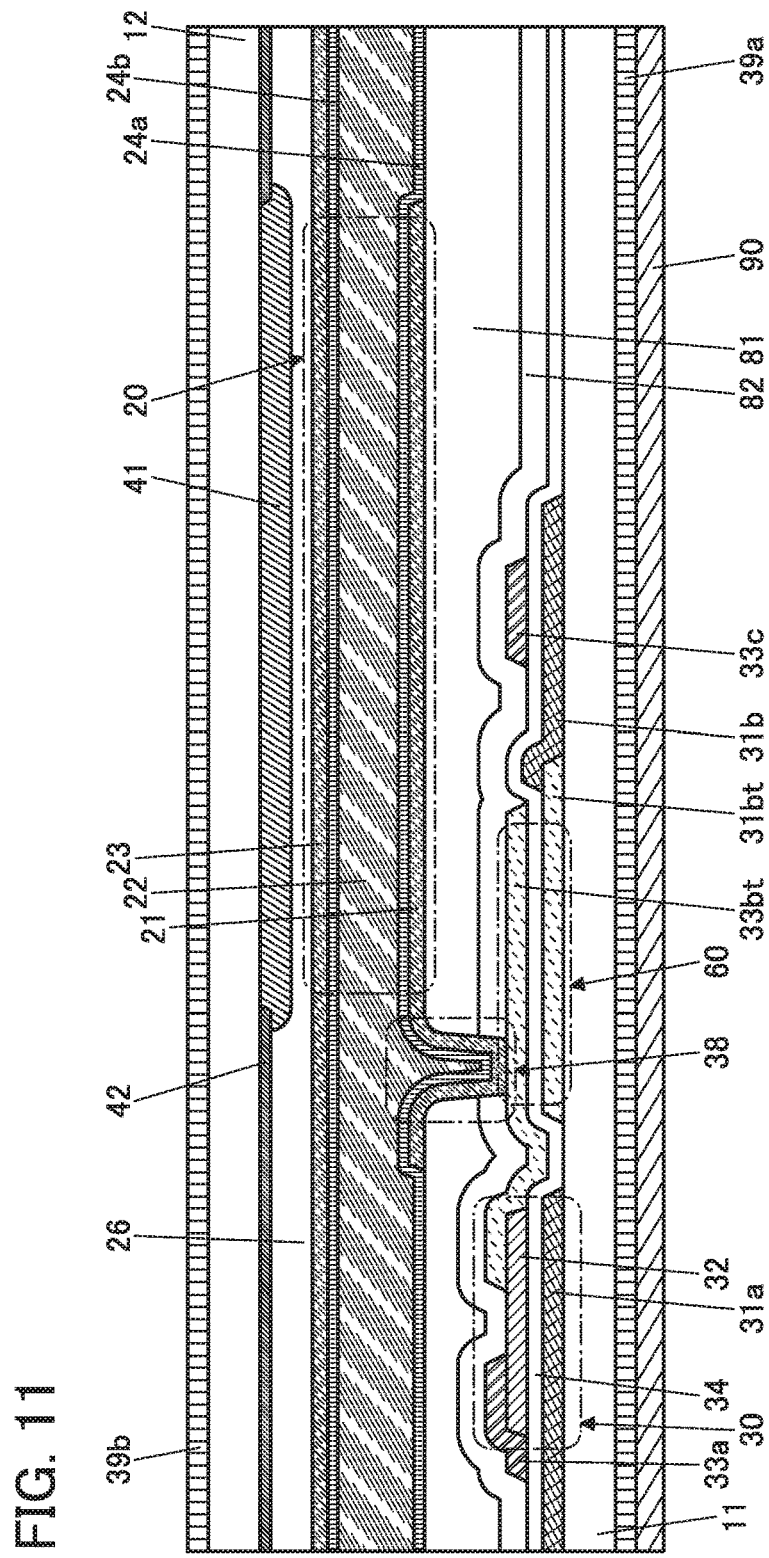
FIG. 11 illustrates a structure example of a display device.

FIG. 11 illustrates a cross section corresponding to the layout illustrated in FIG. 4C.

In FIG. 11, part of the conductive layer 33bt is in contact with the semiconductor layer 32. Thus, part of the conductive layer 33bt functions as one of a source electrode and a drain electrode of the transistor 30.

The conductive layer 21 is provided in contact with part of a top surface of the conductive layer 33bt. The conductive layer 21 and the conductive layer 33bt each include a metal oxide film, which leads to a decrease in contact resistance therebetween.

Cross-Sectional Structure Example 1-6

Figure 12:
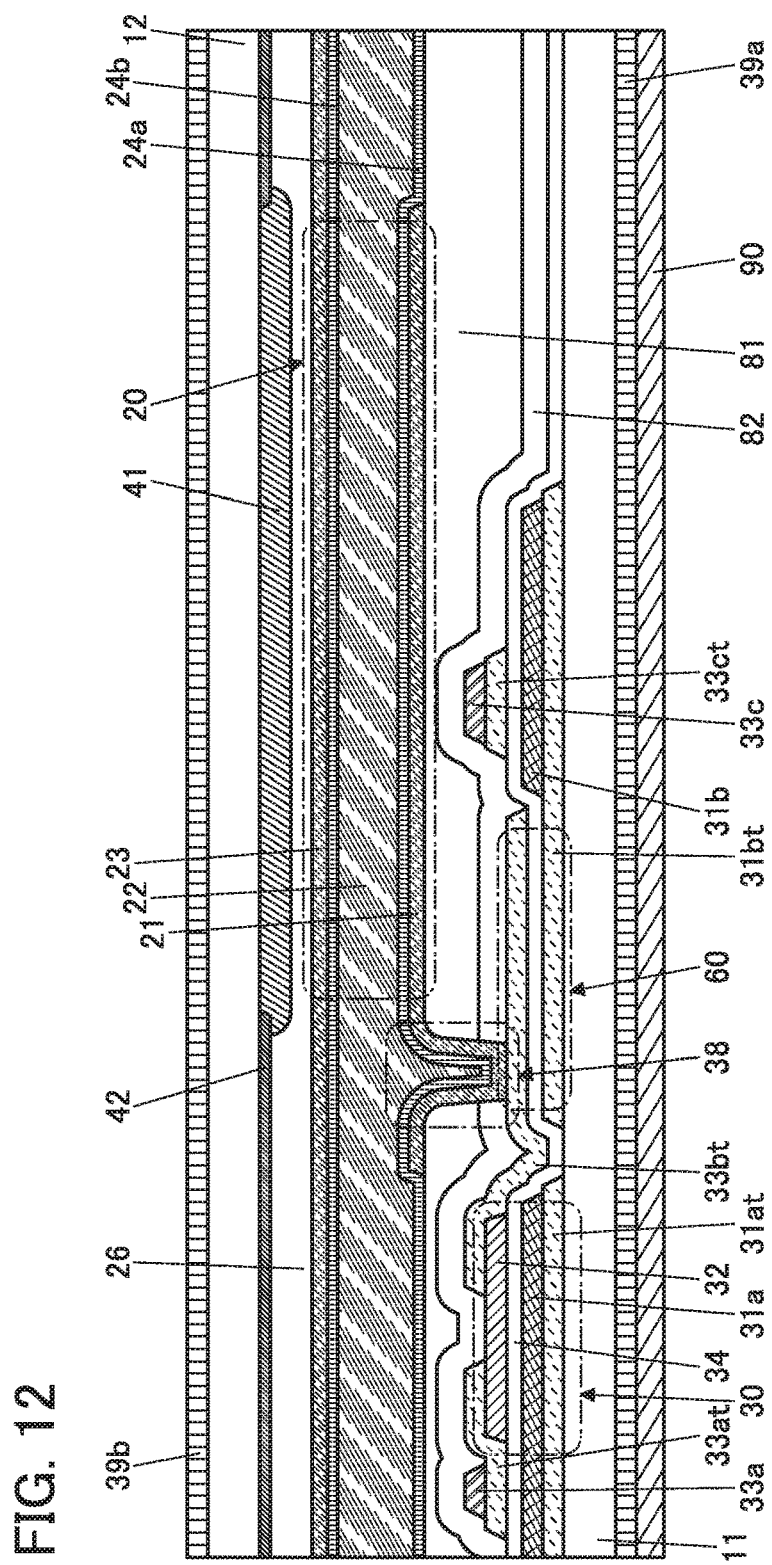
FIG. 12 illustrates a structure example of a display device.

FIG. 12 illustrates an example where a conductive layer functioning as a gate electrode of a transistor and a conductive layer functioning as a source electrode and a drain electrode of the transistor each have a stacked-layer structure including a conductive film having a light-transmitting property and a conductive film having a light-blocking property and are formed by using an exposure technique with a half-tone mask, a gray-tone mask, or the like, or a multiple exposure technique. Thus, a smaller number of photomasks is required.

Note that a stacked layer obtained by such an exposure technique has a characteristic cross-sectional shape in that an end of a layer on the upper side is located inward from an end of a layer on the lower side.

In the transistor 30, a conductive layer 31at is provided on the substrate 11 side of the conductive layer 31a. A pair of conductive layers 33at and 33bt that function as a source electrode and a drain electrode are in contact with the semiconductor layer 32. The conductive layer 33a is provided over the conductive layer 33at.

The capacitor 60 includes part of the conductive layer 33bt and part of the conductive layer 31bt. The conductive layer 31b forming the wiring CS is provided over the conductive layer 33bt.

A conductive layer 33ct is provided below the conductive layer 33c.

Here, the smaller the number of photolithography steps in a manufacturing process of a display device is, i.e., the smaller the number of photomasks is, the lower the manufacturing cost can be.

For example, the display device having the structure illustrated in FIG. 6 can be manufactured through five photolithography steps, i.e., a formation step of the conductive layer 31a and the like, a formation step of the semiconductor layer 32, a formation step of the conductive layer 33a and the like, a formation step of the opening to be the connection portion 38, and a formation step of the conductive layer 21, among steps on the substrate 11 side. That is, a back plane substrate can be manufactured with five photomasks. On the other hand, on the substrate 12 (counter substrate) side, an ink-jet method, a screen printing method, or the like is preferably used as the formation methods of the coloring layer 41 and the light-blocking layer 42, in which case a photomask becomes unnecessary. For example, in the case where three-color coloring layers 41 and the light-blocking layer 42 are provided, four or more photomasks can be reduced compared with the case where these are formed by a photolithography process.

The above is the description of the cross-sectional structure examples.

Structure Example 1 of Transistor

Structure examples of a transistor different from the above transistors are described below.

An OS transistor can be formed by using a metal oxide for the semiconductor layer 32 of the transistor described below. With an OS transistor, the frequency of updating a video signal can be set low in a period during which there is no change in a video or a period during which the change is below a certain level; thus, a reduction in power consumption can be achieved.

Figure 13A:
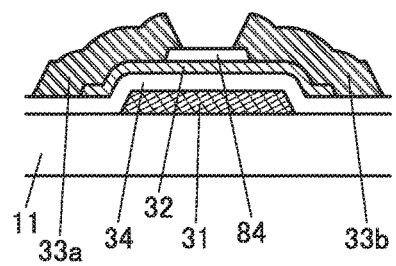
FIGS. 13A to 13E illustrate structure examples of a transistor.

In a transistor illustrated in FIG. 13A, an insulating layer 84 is provided over a channel formation region of the semiconductor layer 32. The insulating layer 84 functions as an etching stopper at the time of etching of the conductive layers 33a and 33b.

Figure 13B:
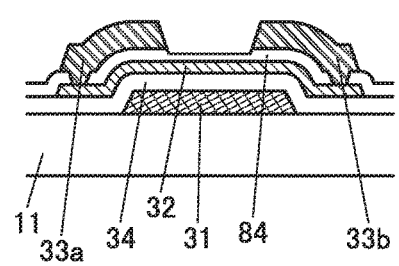

A transistor illustrated in FIG. 13B has a structure in which the insulating layer 84 extends over the insulating layer 34 to cover the semiconductor layer 32. In this case, the conductive layers 33a and 33b are connected to the semiconductor layer 32 through openings in the insulating layer 84.

Figure 13C:
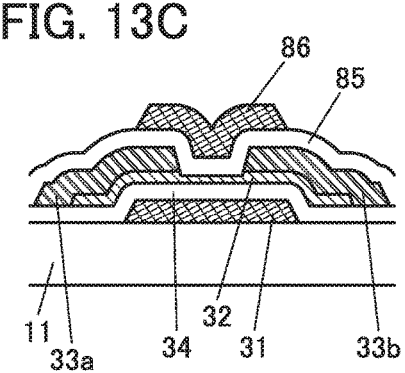

A transistor illustrated in FIG. 13C includes an insulating layer 85 and a conductive layer 86. The insulating layer 85 is provided to cover the semiconductor layer 32, the conductive layer 33a, and the conductive layer 33b. Furthermore, the conductive layer 86 is provided over the insulating layer 85 and includes a region overlapping with the semiconductor layer 32.

The conductive layer 86 is located to face the conductive layer 31 with the semiconductor layer 32 positioned therebetween. In the case where the conductive layer 31 is used as a first gate electrode, the conductive layer 86 can function as a second gate electrode. By applying the same potential to the conductive layer 31 and the conductive layer 86, the on-state current of the transistor can be increased. By applying a potential for controlling the threshold voltage to one of the conductive layers 31 and 86 and a potential for driving to the other, the threshold voltage of the transistor can be controlled.

Although FIGS. 13A to 13C each illustrate an example where an end portion of the semiconductor layer 32 is located outward from an end portion of the conductive layer 31, one embodiment of the present invention is not limited thereto. The end portion of the semiconductor layer 32 may be located inward from the end portion of the conductive layer 31.

Figure 13D:
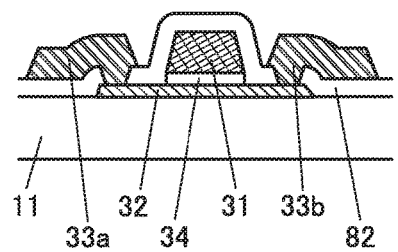

A transistor illustrated in FIG. 13D is a top-gate transistor, and the conductive layer 31 functioning as a gate electrode is provided above the semiconductor layer 32 (on the side opposite to the formation surface side). The insulating layer 34 and the conductive layer 31 are stacked over the semiconductor layer 32. The insulating layer 82 is provided to cover the top surface and side end portions of the semiconductor layer 32 and the conductive layer 31. The conductive layers 33a and 33b are provided over the insulating layer 82. The conductive layers 33a and 33b are connected to the semiconductor layer 32 through openings in the insulating layer 82.

Note that although the insulating layer 34 is not present in a portion that does not overlap with the conductive layer 31 in this example, the insulating layer 34 may be provided to cover the upper surface and the side end portions of the semiconductor layer 32.

In the transistor illustrated in FIG. 13D, the physical distance between the conductive layer 31 and each of the conductive layers 33a and 33b can be easily increased, so that the parasitic capacitance therebetween can be reduced.

Figure 13E:
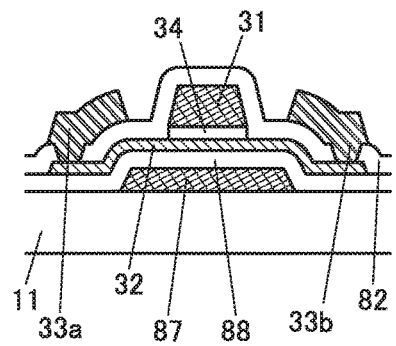

A transistor illustrated in FIG. 13E is different from the transistor illustrated in FIG. 13D in that the transistor illustrated in FIG. 13E includes a conductive layer 87 and an insulating layer 88. The conductive layer 87 includes a region overlapping with the semiconductor layer 32. The insulating layer 88 covers the conductive layer 87.

The conductive layer 87 functions as a second gate electrode. Thus, the on-state current can be increased and the threshold voltage can be controlled, for example.

The above is the description of the structure examples of the transistor.

Cross-Sectional Structure Example 2

Cross-sectional structure examples of a display device including silicon for a semiconductor layer of a transistor are described below.

Cross-Sectional Structure Example 2-1

Figure 14:
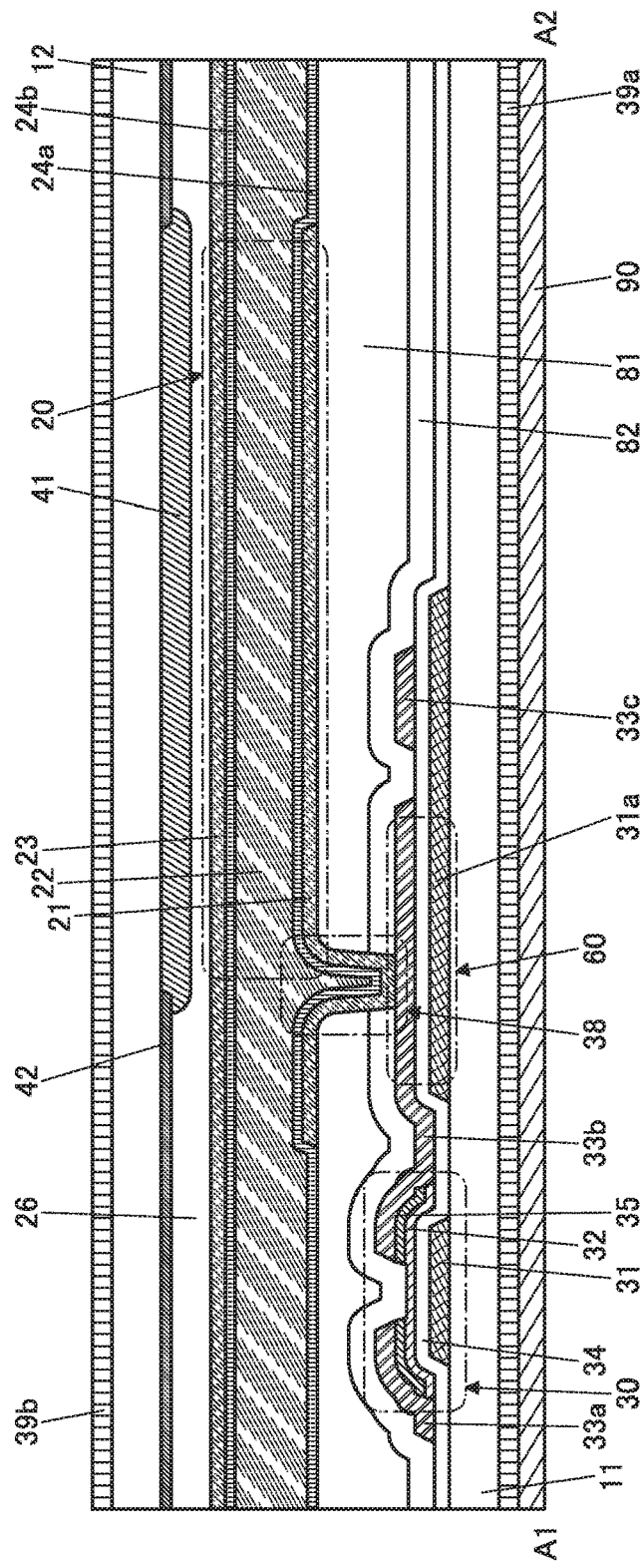
FIG. 14 illustrates a structure example of a display device.

A structure illustrated in FIG. 14 is different from the structure described in the above cross-sectional structure example 1-1 (FIG. 8) mainly in the structure of the transistor 30.

The transistor 30 illustrated in FIG. 14 is what is called a channel-etched bottom-gate transistor. The transistor 30 includes the conductive layer 31 functioning as a gate electrode, the insulating layer 34 functioning as a gate insulating layer, the semiconductor layer 32, a pair of impurity semiconductor layers 35 functioning as a source region and a drain region, and a pair of conductive layers 33a and 33b functioning as a source electrode and a drain electrode. A region of the semiconductor layer 32 overlapping with the conductive layer 31 functions as a channel formation region. The semiconductor layer 32 is in contact with the impurity semiconductor layer 35, and the impurity semiconductor layer 35 is in contact with the conductive layer 33a or 33b.

A semiconductor containing silicon is preferably used for the semiconductor layer 32. For example, amorphous silicon, microcrystalline silicon, polycrystalline silicon, or the like can be used. Amorphous silicon is particularly preferable because it can be formed over a large substrate with a high yield. A display device of one embodiment of the present invention can perform favorable display even with a transistor including amorphous silicon having relatively low field-effect mobility. As amorphous silicon, hydrogenated amorphous silicon (denoted by a-Si:H in some cases) in which dangling bonds are terminated by hydrogen is preferably used.

The impurity semiconductor film to form the impurity semiconductor layer 35 is formed using a semiconductor to which an impurity element imparting one conductivity type is added. In the case where the transistor is an n-channel transistor, for example, silicon to which P or As is added is given as a semiconductor to which an impurity element imparting one conductivity type is added. In the case where the transistor is a p-channel transistor, for example, it is possible to add B as the impurity element imparting one conductivity type; however, it is preferable to use an n-channel transistor. Note that the impurity semiconductor layer 35 may be formed using an amorphous semiconductor or a crystalline semiconductor such as a microcrystalline semiconductor.

Cross-Sectional Structure Example 2-2

Figure 15:
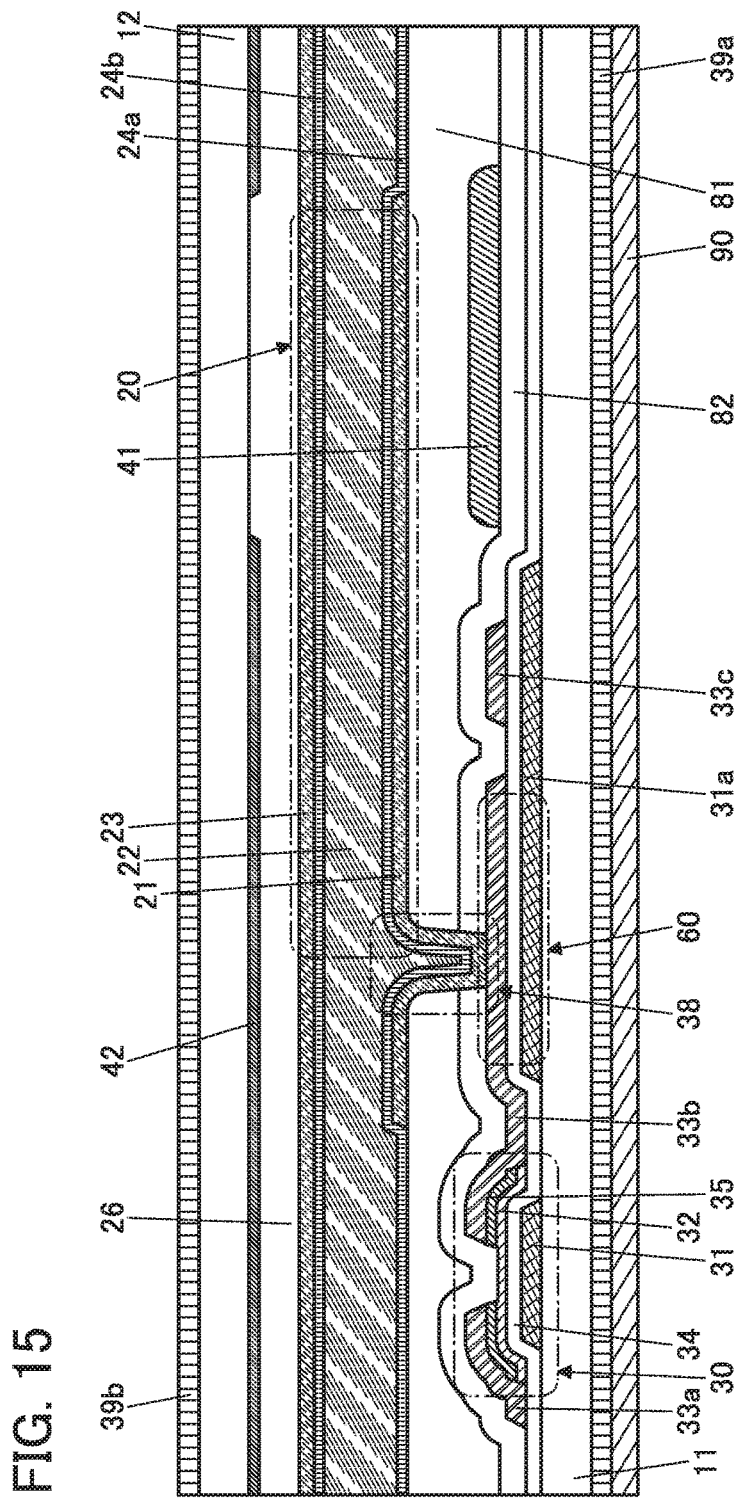
FIG. 15 illustrates a structure example of a display device.

FIG. 15 illustrates an example where the coloring layer 41 is provided on the substrate 11 side. The cross-sectional structure example 1-2 can be referred to for Cross-sectional structure example 2-2 except the structure of the transistor 30.

Cross-Sectional Structure Example 2-3

Figure 16:
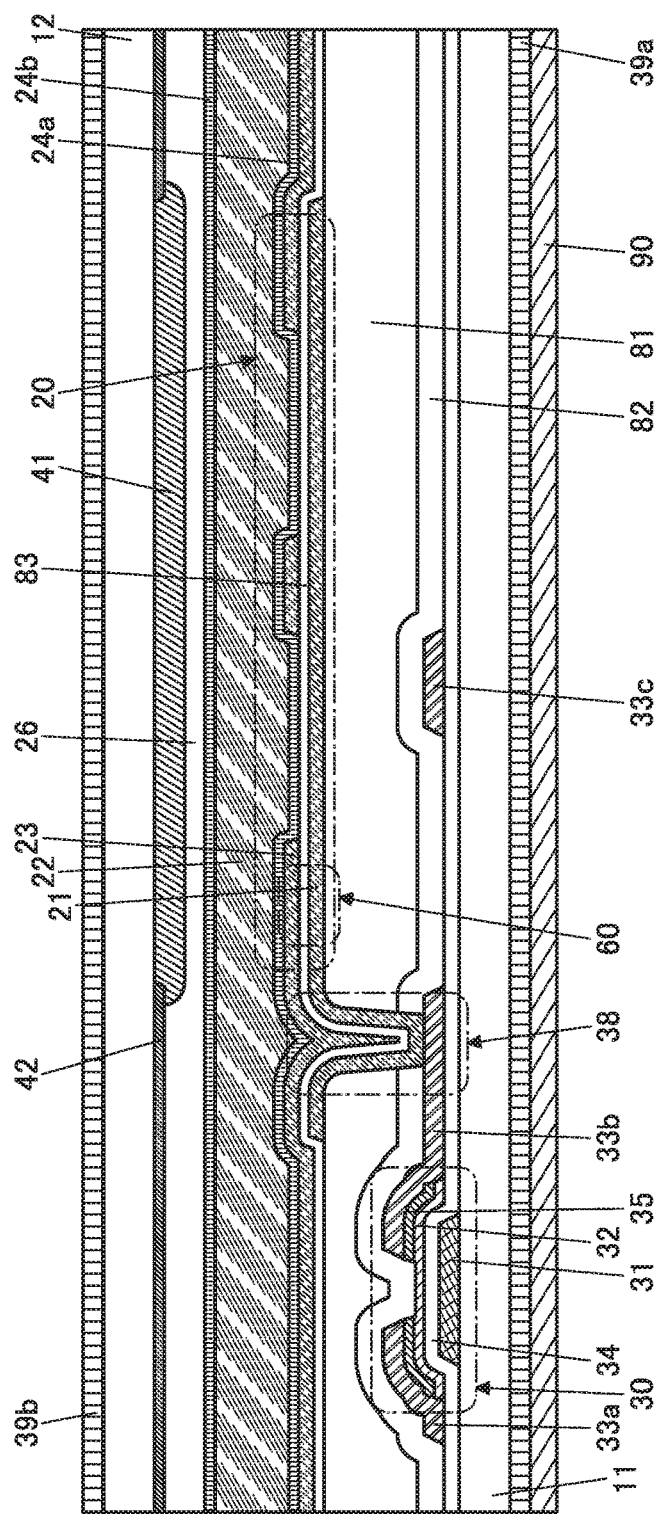
FIG. 16 illustrates a structure example of a display device.
Figure 17:
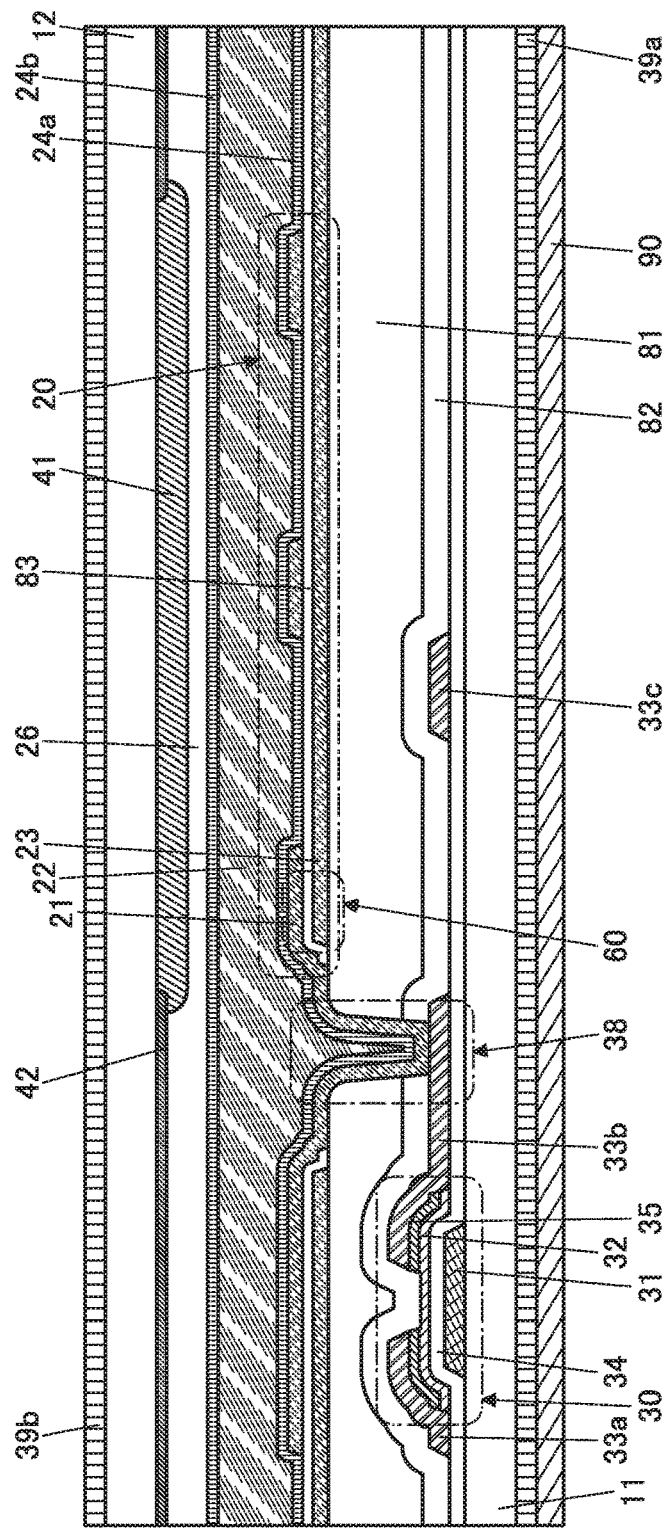
FIG. 17 illustrates a structure example of a display device.

FIG. 16 and FIG. 17 each are a schematic cross-sectional view of a display device including a liquid crystal element using an FFS mode. The cross-sectional structure example 1-3 can be referred to for Cross-sectional structure example 2-3 except the structure of the transistor 30.

The above is the description of Cross-sectional structure example 2.

Structure Example 2 of Transistor

Structure examples of a transistor different from the above transistors are described below.

Figure 18A:
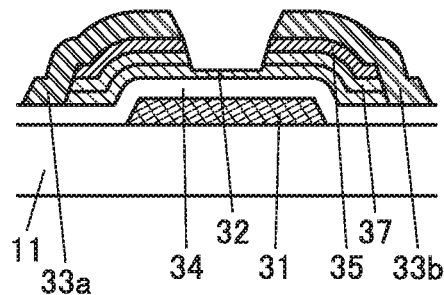
FIGS. 18A to 18F illustrate structure examples of a transistor.

A transistor illustrated in FIG. 18A includes a semiconductor layer 37 between the semiconductor layer 32 and the impurity semiconductor layer 35.

The semiconductor layer 37 may be formed using the same semiconductor film as the semiconductor layer 32. The semiconductor layer 37 can function as an etching stopper for preventing the semiconductor layer 32 from being removed at the time of etching of the impurity semiconductor layer 35. Although FIG. 18A illustrates an example where the semiconductor layer 37 is divided into a right portion and a left portion, part of the semiconductor layer 37 may cover a channel formation region of the semiconductor layer 32.

Furthermore, the semiconductor layer 37 may contain an impurity at a concentration lower than the impurity semiconductor layer 35. Thus, the semiconductor layer 37 can function as a lightly doped drain (LDD) region and can suppress hot-carrier degradation when the transistor is driven.

Figure 18B:
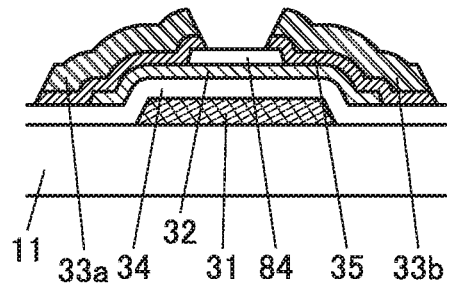

In a transistor illustrated in FIG. 18B, the insulating layer 84 is provided over a channel formation region of the semiconductor layer 32. The insulating layer 84 functions as an etching stopper at the time of etching of the impurity semiconductor layer 35.

Figure 18C:
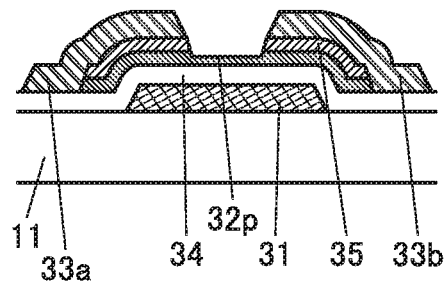

A transistor illustrated in FIG. 18C includes a semiconductor layer 32p instead of the semiconductor layer 32. The semiconductor layer 32p includes a semiconductor film having high crystallinity. For example, the semiconductor layer 32p includes a polycrystalline semiconductor or a single crystal semiconductor. Thus, a transistor having high field-effect mobility can be provided.

Figure 18D:
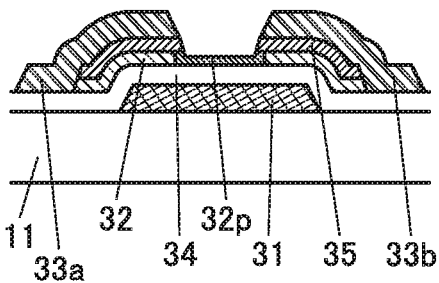

A transistor illustrated in FIG. 18D includes the semiconductor layer 32p in a channel formation region of the semiconductor layer 32. For example, the transistor illustrated in FIG. 18D can be formed by irradiating a semiconductor film to be the semiconductor layer 32 with laser light or the like so that crystallization is caused locally. Thus, a transistor having high field-effect mobility can be provided.

Figure 18E:
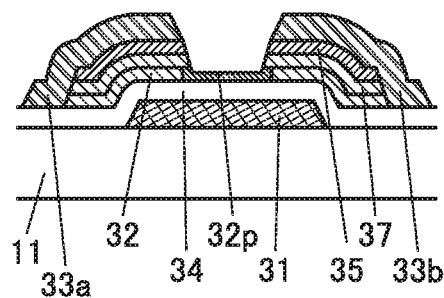

A transistor illustrated in FIG. 18E includes the semiconductor layer 32p having crystallinity in a channel formation region of the semiconductor layer 32 of the transistor illustrated in FIG. 18A.

Figure 18F:
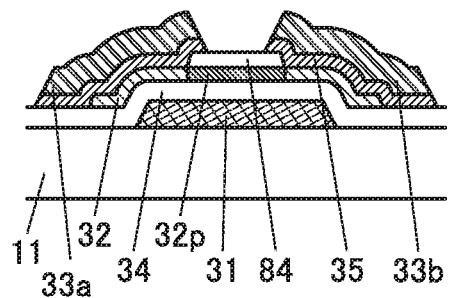

A transistor illustrated in FIG. 18F includes the semiconductor layer 32p having crystallinity in a channel formation region of the semiconductor layer 32 of the transistor illustrated in FIG. 18B.

The above is the description of Structure example 2 of transistor.

[Shape of Conductive Layer]

For a conductive film which can be used as a wiring such as a gate line or a source line, a low-resistance material such as metal or an alloy is preferably used because it can reduce the wiring resistance. In the case where a display device having a large screen is fabricated, increasing the width of a wiring is also effective. However, such a conductive film does not transmit visible light, and in a transmissive liquid crystal display device, the following problems occur in some cases: the width of a wiring itself is large; and the aperture ratio is decreased owing to an increase in the number of wirings.

The shape of an end portion of the conductive film is devised, whereby light from a backlight unit can be extracted efficiently.

Figure 19A:
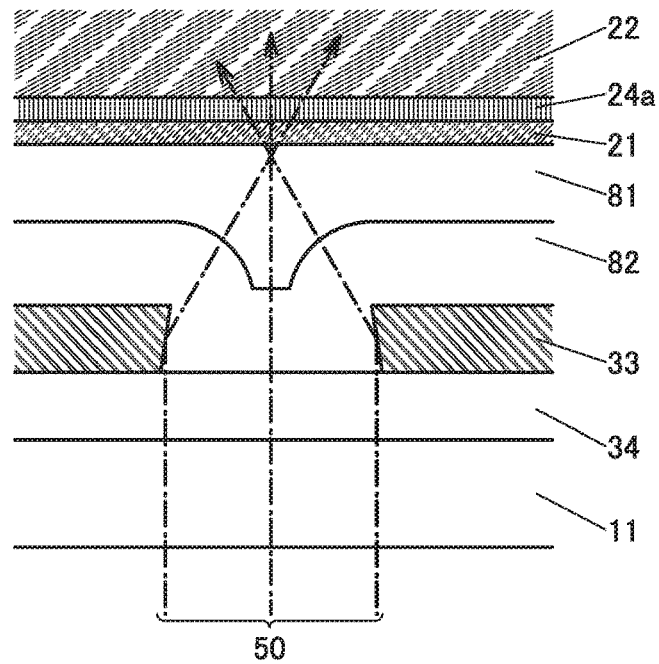
FIGS. 19A and 19B illustrate structure examples of a display device.

FIG. 19A is a cross-sectional view of the conductive layer 33 forming a source line or the like and the vicinity thereof. The conductive layer 33 has an inverse tapered end portion.

Here, a taper angle refers to an angle between a bottom surface (a surface in contact with a surface where a thin film is formed) and a side surface at an end portion of the thin film. The taper angle is greater than 0° and less than 180°. A taper with an angle less than 90° is referred to as a forward taper whereas a taper with an angle greater than 90° is referred to as an inverse taper.

As illustrated in FIG. 19A, when the conductive layer 33 has an inverse tapered shape, part of light 50 from the backlight unit is reflected by a side surface of the conductive layer 33 and reaches the liquid crystal 22. Consequently, the light extraction efficiency can be increased compared with the case where the conductive layer 33 has a perpendicular side surface or a tapered side surface.

Here, the taper angle of the conductive layer 33 is preferably greater than 90° and less than 135°, further preferably greater than or equal to 91° and less than or equal to 120°, still further preferably greater than or equal to 95° and less than or equal to 110°.

Figure 19B:
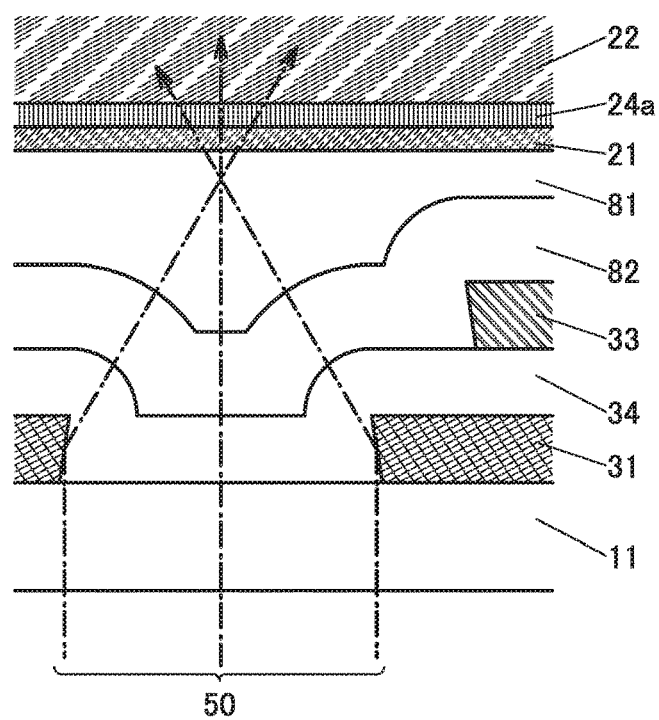

FIG. 19B illustrates an example where the conductive layer 31 forming a gate line or the like has an inverse tapered shape. When the conductive layer 31 has an inverse tapered shape as well as the conductive layer 33, the light extraction efficiency can be increased more efficiently.

The above is the description of the wiring shape.

[Components]

The above-described components are described below.

<Substrate>

A material having a flat surface can be used as the substrate included in the display panel. The substrate on the side from which light from the display element is extracted is formed using a material transmitting the light. For example, a material such as glass, quartz, ceramics, sapphire, or an organic resin can be used.

The weight and thickness of the display panel can be reduced by using a thin substrate. A flexible display panel can be obtained by using a substrate that is thin enough to have flexibility. Alternatively, glass or the like that is thin enough to have flexibility can be used as the substrate. Alternatively, a composite material where glass and a resin material are attached to each other with an adhesive layer may be used.

<Transistor>

The transistor includes a conductive layer functioning as a gate electrode, a semiconductor layer, a conductive layer functioning as a source electrode, a conductive layer functioning as a drain electrode, and an insulating layer functioning as a gate insulating layer.

Note that there is no particular limitation on the structure of the transistor included in the display device of one embodiment of the present invention. For example, a planar transistor, a staggered transistor, or an inverted staggered transistor can be used. A top-gate transistor or a bottom-gate transistor may also be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferred that a semiconductor having crystallinity be used, in which case deterioration of the transistor characteristics can be suppressed.

As a semiconductor material used for the transistor, a metal oxide whose energy gap is greater than or equal to 2 eV, preferably greater than or equal to 2.5 eV, further preferably greater than or equal to 3 eV can be used. A typical example is a metal oxide containing indium, and a CAC-OS described later can be used, for example.

Because of a low off-state current of a transistor that contains a metal oxide having a larger band gap and a lower carrier density than silicon, charge stored in a capacitor connected in series with the transistor can be held for a long time.

The semiconductor layer can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the metal oxide contained in the semiconductor layer is an In-M-Zn-based oxide, the atomic ratio of metal elements of a sputtering target used for forming a film of the In-M-Zn oxide preferably satisfy In≥M and Zn≥M. The atomic ratio of the metal elements (In:M: Zn) in such a sputtering target is preferably 1:1:1, 1:1:1.2, 3:1:2, 4:2:3, 4:2:4.1, 5:1:6, 5:1:7, or 5:1:8, for example. Note that the atomic ratio of the metal elements in the formed semiconductor layer varies from the above atomic ratios of the metal elements of the sputtering targets in a range of ±40%.

The bottom-gate transistor described in this embodiment is preferable because the number of manufacturing steps can be reduced. When a metal oxide, which can be formed at a lower temperature than polycrystalline silicon, is used for the bottom-gate transistor, materials with low heat resistance can be used for a wiring, an electrode, or a substrate below the semiconductor layer; thus, the range of choices of materials can be widened. For example, an extremely large glass substrate can be favorably used.

A metal oxide film with low carrier density is used as the semiconductor layer. For example, the semiconductor layer is a metal oxide whose carrier density is lower than or equal to $1 \times 10^{17}/cm^3$, preferably lower than or equal to $1 \times 10^{15}/cm^3$, further preferably lower than or equal to $1 \times 10^{13}/cm^3$, still further preferably lower than or equal to $1 \times 10^{11}/cm^3$, even further preferably lower than $1 \times 10^{10}/cm^3$, and higher than or equal to $1 \times 10^{-9}/cm^3$. Such a metal oxide is referred to as a highly purified intrinsic or substantially highly purified intrinsic metal oxide. The metal oxide has a low impurity concentration and a low density of defect states and can thus be referred to as a metal oxide having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the metal oxide contained in the semiconductor layer, oxygen vacancies are increased in the semiconductor layer, and the semiconductor layer becomes n-type. Thus, the concentration of silicon or carbon (measured by secondary ion mass spectrometry) in the semiconductor layer is lower than or equal to $2 \times 10^{18}$ atoms/cm$^3$, preferably lower than or equal to $2 \times 10^{17}$ atoms/cm$^3$.

Alkali metal and alkaline earth metal might generate carriers when bonded to a metal oxide, in which case the off-state current of the transistor might be increased. Therefore, the concentration of alkali metal or alkaline earth metal of the semiconductor layer, which is measured by secondary ion mass spectrometry, is lower than or equal to $1 \times 10^{18}$ atoms/cm$^3$, preferably lower than or equal to $2 \times 10^{16}$ atoms/cm$^3$.

When nitrogen is contained in the metal oxide contained in the semiconductor layer, electrons functioning as carriers are generated and the carrier density increases, so that the semiconductor layer easily becomes n-type. Thus, a transistor including a metal oxide which contains nitrogen is likely to be normally on. Hence, the concentration of nitrogen in the semiconductor layer which is measured by secondary ion mass spectrometry is preferably lower than or equal to $5 \times 10^{18}$ atoms/cm$^3$.

An oxide semiconductor is classified into a single crystal oxide semiconductor and a non-single-crystal oxide semiconductor. Examples of a non-single-crystal oxide semiconductor include a c-axis-aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

For the semiconductor layer of the transistor disclosed in one embodiment of the present invention, a cloud-aligned composite oxide semiconductor (CAC-OS) may be used.

Note that the above-described non-single-crystal oxide semiconductor or CAC-OS can be suitably used for the semiconductor layer of the transistor disclosed in one embodiment of the present invention. As the non-single-crystal oxide semiconductor, the nc-OS or the CAAC-OS can be suitably used.

In one embodiment of the present invention, the CAC-OS is preferably used for the semiconductor layer of the transistor. With the use of the CAC-OS, the transistor can have excellent electrical characteristics or high reliability.

The semiconductor layer may be a mixed film including two or more of the following: a region of a CAAC-OS, a region of a polycrystalline oxide semiconductor, a region of an nc-OS, a region of an amorphous-like oxide semiconductor, and a region of an amorphous oxide semiconductor. The mixed film has, for example, a single-layer structure or a stacked-layer structure including two or more of the above-described regions in some cases.

<Composition of CAC-OS>

Described below is the composition of a cloud-aligned composite oxide semiconductor (CAC-OS) applicable to a transistor disclosed in one embodiment of the present invention.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ (−1≤x0≤1; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not intentionally heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of a metal oxide is exhibited. Accordingly, when regions including $In_{X2}Zn_{Y2}O_{Z2}$ or $InO_{X1}$ as a main component are distributed in a metal oxide like a cloud, high field-effect mobility ($\mu$) can be achieved.

By contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in a metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and high field-effect mobility ($\mu$) can be achieved.

A semiconductor element including a CAC-OS has high reliability. Thus, the CAC-OS is suitably used in a variety of semiconductor devices typified by a display.

Since a transistor including a CAC-OS in a semiconductor layer has high field-effect mobility and high driving capability, the use of the transistor in a driver circuit (typically, a scan line driver circuit that generates a gate signal) allows a display device to have a narrow bezel. Moreover, the use of the transistor in a signal line driver circuit that is included in a display device (particularly in a demultiplexer connected to an output terminal of a shift register included in the signal line driver circuit) can reduce the number of wirings connected to the display device.

The transistor including a CAC-OS in the semiconductor layer does not need a laser crystallization step necessary for a transistor including low-temperature polysilicon. Thus, the manufacturing cost of a display device can be reduced even when the display device is formed using a large substrate. In addition, it is preferable to use the transistor including a CAC-OS in the semiconductor layer for a driver circuit and a display portion in a large display device having high resolution such as ultra-high definition ("4K resolution," "4K2K," and "4K") or super high definition ("8K resolution," "8K4K," and "8K"), in which case writing can be performed in a short time and display defects can be reduced.

Alternatively, silicon can be used as a semiconductor in which a channel of the transistor is formed, for example. In particular, when amorphous silicon is used as silicon, a transistor can be formed over a large substrate with a high yield. When amorphous silicon is used, hydrogenated amorphous silicon (denoted by a-Si:H in some cases) in which dangling bonds are terminated by hydrogen is preferably used.

Furthermore, silicon having crystallinity such as microcrystalline silicon, polycrystalline silicon, or single-crystal silicon can be used. In particular, polycrystalline silicon can be formed at a lower temperature than single-crystal silicon and has higher field-effect mobility and higher reliability than amorphous silicon.

When silicon is used, an impurity semiconductor layer to which an impurity element imparting one conductivity type is added is preferably provided between a semiconductor layer and a source electrode or a drain electrode. In the case where the transistor is an n-channel transistor, for example, silicon to which P or As is added is given as a semiconductor to which an impurity element imparting one conductivity type is added. In the case where the transistor is a p-channel transistor, for example, it is possible to add B as the impurity element imparting one conductivity type; however, it is preferable to use an n-channel transistor. Note that the impurity semiconductor layer may be formed using an amorphous semiconductor or a crystalline semiconductor such as a microcrystalline semiconductor.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, or a substrate below the semiconductor layer, resulting in wider choice of materials. For example, an extremely large glass substrate can be favorably used. Meanwhile, the top-gate transistor is preferable because an impurity region is easily formed in a self-aligned manner and variation in characteristics can be reduced. In some cases, the top-gate transistor is particularly preferable when polycrystalline silicon, single-crystal silicon, or the like is employed.

<Conductive Layer>

As materials for the gates, the source, and the drain of a transistor, and the conductive layers functioning as the wirings and electrodes included in the display device, any of metals such as aluminum, titanium, chromium, nickel, copper, yttrium, zirconium, molybdenum, silver, tantalum, and tungsten, or an alloy containing any of these metals as its main component can be used. A single-layer structure or a stacked-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because it increases controllability of a shape by etching.

As a light-transmitting conductive material that can be used for the gate, source, and drain of the transistor and the conductive layers such as the wirings and electrodes included in the display device, a conductive oxide such as indium oxide, an indium tin oxide, an indium zinc oxide, zinc oxide, or zinc oxide to which gallium is added or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. In the case of using the metal material or the alloy material (or the nitride thereof), the thickness is set small enough to be able to transmit light. A stacked film of any of the above materials can be used for the conductive layers. For example, a stacked film of an indium tin oxide and an alloy of silver and magnesium is preferably used because it can increase the conductivity. They can also be used for conductive layers such as wirings and electrodes included in the display device, and conductive layers (e.g., a conductive layer functioning as a pixel electrode or a common electrode) included in a display element.

An oxide semiconductor (oxide conductor: OC) whose resistance is lowered by adding an impurity element, for example, is preferably used as the light-transmitting conductive material.

<Insulating Layer>

Examples of an insulating material that can be used for the insulating layers include a resin such as acrylic or epoxy resin, a resin having a siloxane bond, and an inorganic insulating material such as silicon oxide, silicon oxynitride, silicon nitride oxide, silicon nitride, or aluminum oxide.

Examples of the insulating film with low water permeability include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

<Liquid Crystal Element>

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, an electrically controlled birefringence (ECB) mode, or a guest-host mode can be used.

The liquid crystal element controls the transmission or non-transmission of light utilizing an optical modulation action of a liquid crystal. Note that the optical modulation action of the liquid crystal is controlled by an electric field applied to the liquid crystal (including a horizontal electric field, a vertical electric field, or an oblique electric field). As the liquid crystal used for the liquid crystal element, a thermotropic liquid crystal, a low-molecular liquid crystal, a high-molecular liquid crystal, a polymer dispersed liquid crystal (PDLC), a polymer network liquid crystal (PNLC), a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either a positive liquid crystal or a negative liquid crystal may be used, and an appropriate liquid crystal material can be used depending on the mode or design to be used.

An alignment film can be provided to adjust the alignment of a liquid crystal. In the case where a horizontal electric field mode is employed, a liquid crystal exhibiting a blue phase for which an alignment film is unnecessary may be used. The blue phase is a liquid crystal phase, which is generated just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition containing a liquid crystal exhibiting a blue phase and a chiral material has a short response time and optical isotropy, which eliminates the need for an alignment process and reduces the viewing angle dependence. Since the alignment film does not need to be provided, rubbing treatment is not necessary; accordingly, electrostatic discharge damage caused by the rubbing treatment can be prevented, reducing defects and damage of a liquid crystal display device in the manufacturing process.

Examples of the liquid crystal element include a transmissive liquid crystal element, a reflective liquid crystal element, and a semi-transmissive liquid crystal element.

In one embodiment of the present invention, a transmissive liquid crystal element is particularly suitable.

In the case where a transmissive or semi-transmissive liquid crystal element is used, two polarizing plates are provided such that a pair of substrates are sandwiched therebetween. Furthermore, a backlight is provided on the outer side of the polarizing plate. The backlight may be a direct-below backlight or an edge-light backlight. The direct-below backlight including a light-emitting diode (LED) is preferably used because local dimming is easily performed to improve contrast. The edge-light backlight is preferably used because the thickness of a module including the backlight can be reduced.

When the edge-light backlight is turned off, one embodiment of the present invention can be used as a see-through display.

<Coloring Layer>

Examples of a material that can be used for the coloring layers include a metal material, a resin material, and a resin material containing a pigment or dye.

<Light-Blocking Layer>

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure including a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

The above is the descriptions of Components.

At least part of any of the structure examples, the manufacturing method examples, the drawings corresponding thereto, and the like described in this embodiment can be implemented in combination with any of the other structure examples, the other manufacturing method examples, the other drawings corresponding thereto, and the like as appropriate.

At least part of this embodiment can be implemented in combination with any of the other embodiments described in this specification as appropriate.

Embodiment 2

In this embodiment, examples of a method of crystallization for polycrystalline silicon which can be used for a semiconductor layer of a transistor and a laser crystallization apparatus are described.

To form polycrystalline silicon layers having favorable crystallinity, it is preferable that an amorphous silicon layer be provided over a substrate and crystallized by laser irradiation. For example, the substrate is moved while the amorphous silicon layer is irradiated with a linear beam, so that polycrystalline silicon layers can be formed in desired regions over the substrate.

The throughput of a method using a linear beam is relatively preferable. On the other hand, the method tends to produce variations in crystallinity owing to a change in the output of laser light and a change in the beam profile caused by the output change because laser light is moved relative to a region and is emitted to the region a plurality of times. For example, when a semiconductor layer crystallized by the above method is used for a transistor included in a pixel of a display device, a random stripe pattern due to the variation in the crystallinity is seen in some cases at the time of displaying an image.

The length of the linear beam is ideally greater than or equal to the length of a side of the substrate; however, the length of the linear beam is limited by an output of a laser oscillator and the structure of an optical system. Thus, it is practical to irradiate a large substrate with the laser light by turning back the laser light in a substrate plane. Consequently, there is a region irradiated with the laser light a plurality of times. Since the crystallinity of such a region is likely to be different from that of the other region, display unevenness is sometimes caused in the region.

To avoid such a problem, an amorphous silicon layer formed over a substrate may be crystallized by local laser irradiation. Local laser irradiation easily forms polycrystalline silicon layers with small variation in crystallinity.

FIG. 20A illustrates a method of locally irradiating an amorphous silicon layer formed over a substrate with laser light.

Laser light 826 emitted from an optical system unit 821 is reflected by a mirror 822 and enters a microlens array 823. The microlens array 823 collects the laser light 826 to form a plurality of laser beams 827.

A substrate 830 over which an amorphous silicon layer 840 is formed is fixed to a stage 815. The amorphous silicon layer 840 is irradiated with the plurality of laser beams 827, so that a plurality of polycrystalline silicon layers 841 can be formed at the same time.

Microlenses of the microlens array 823 are preferably provided with a pixel pitch of a display device. Alternatively, they may be provided at intervals of an integral multiple of the pixel pitch. In either of the cases, polycrystalline silicon layers can be formed in regions corresponding to all pixels by repeating laser irradiation and movement of the stage 815 in the X direction or the Y direction.

For example, when the microlens array 823 includes M rows and N columns (M and N are natural numbers) of microlenses arranged with a pixel pitch, laser irradiation is performed at a predetermined start position first, so that M rows and N columns of polycrystalline silicon layers 841 can be formed. Then, the stage 815 is moved by N columns in the row direction and laser irradiation is performed, so that M rows and N columns of polycrystalline silicon layers 841 can be further formed. Consequently, M rows and 2N columns of polycrystalline silicon layers 841 can be obtained. By repeating the steps, a plurality of polycrystalline silicon layers 841 can be formed in desired regions. In the case where laser irradiation is performed by turning back the laser light, the following steps are repeated: the stage 815 is moved by N columns in the row direction; laser irradiation is performed; the stage 815 is moved by M rows in the column direction: and laser irradiation is performed.

Note that even when a method of performing laser irradiation while the stage 815 is moved in one direction is employed, polycrystalline silicon layers can be formed with a pixel pitch by adjusting the oscillation frequency of the laser light and the moving speed of the stage 815 properly.

The size of the laser beam 827 can be an area in which the whole semiconductor layer of a transistor is included, for example. Alternatively, the size can be an area in which the whole channel region of a transistor is included. Further alternatively, the size can be an area in which part of a channel region of a transistor is included. The size can be selected from them depending on required electrical characteristics of a transistor.

Note that in the case of a display device including a plurality of transistors in a pixel, the size of the laser beam 827 can be an area in which the whole semiconductor layer of each transistor in a pixel is included. Alternatively, the size of the laser beam 827 may be an area in which the whole semiconductor layers of transistors in a plurality of pixels are included.

Figure 21A:
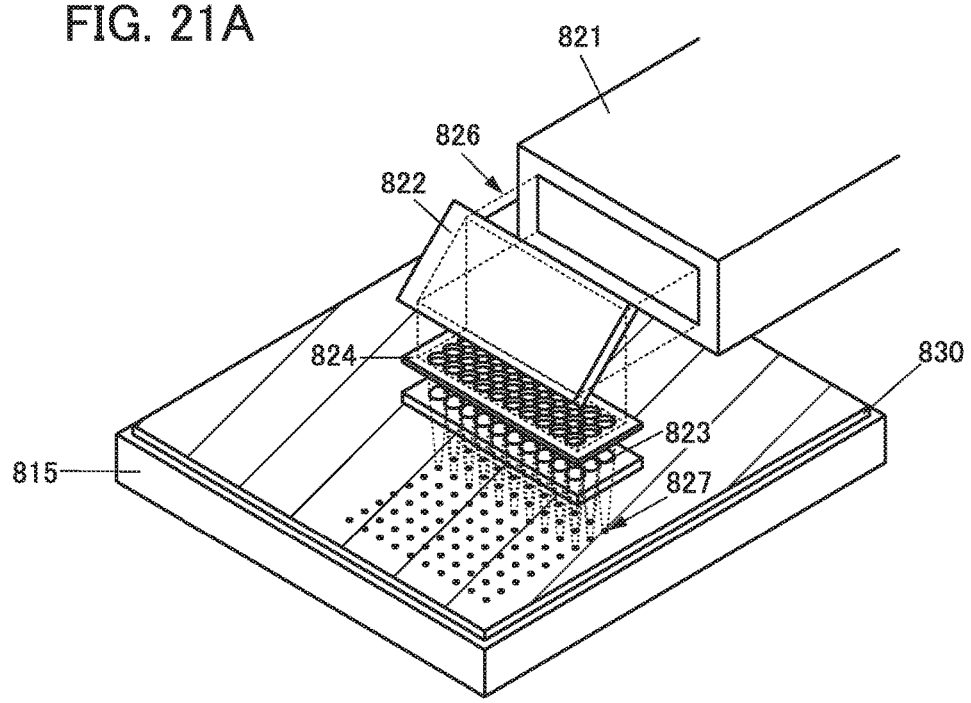
FIGS. 21A and 21B illustrate a laser irradiation method.
Figure 21B:
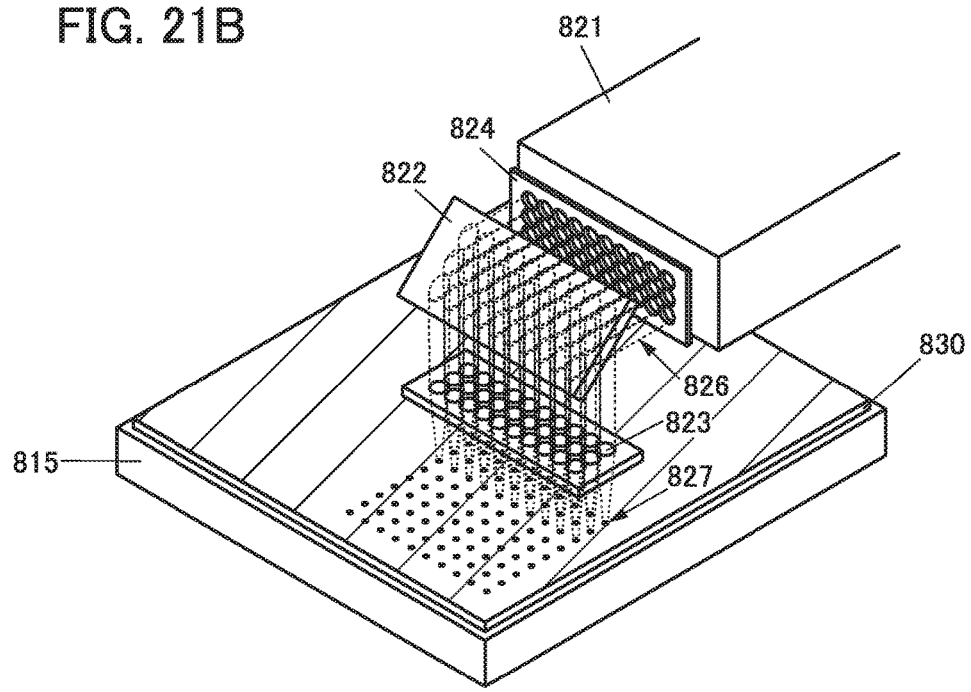

As illustrated in FIG. 21A, a mask 824 may be provided between the mirror 822 and the microlens array 823. The mask 824 includes a plurality of openings corresponding to respective microlenses. The shape of the opening can be reflected by the shape of the laser beam 827; as illustrated in FIG. 21A, the laser beam 827 having a circular shape can be obtained in the case where the mask 824 includes circular openings. The laser beam 827 having a rectangular shape can be obtained in the case where the mask 824 includes rectangular openings. The mask 824 is effective in the case where only a channel region of a transistor is crystallized, for example. Note that the mask 824 may be provided between the optical system unit 821 and the mirror 822 as illustrated in FIG. 21B.

FIG. 20B is a perspective view illustrating a main structure of a laser crystallization apparatus which can be used in the above local laser irradiation step. The laser crystallization apparatus includes a moving mechanism 812, a moving mechanism 813, and the stage 815 which are components of an XY stage. The crystallization apparatus further includes a laser oscillator 820, the optical system unit 821, the mirror 822, and the microlens array 823 to shape the laser beam 827.

The moving mechanism 812 and the moving mechanism 813 each have a function of performing reciprocating linear motion in the horizontal direction. As a mechanism for powering the moving mechanism 812 and the moving mechanism 813, a ball screw mechanism 816 driven by a motor can be used, for example. The moving directions of the moving mechanism 812 and the moving mechanism 813 cross orthogonally; thus, the stage 815 fixed to the moving mechanism 813 can be moved in the X direction and in the Y direction freely.

The stage 815 includes a fixing mechanism such as a vacuum suction mechanism and can fix the substrate 830 or the like. Furthermore, the stage 815 may include a heating mechanism as needed. Although not illustrated, the stage 815 may include a pusher pin and a vertical moving mechanism thereof, and the substrate 830 or the like can be moved up and down when being transferred.

The laser oscillator 820 is preferably a pulsed laser, but may be a CW laser as long as it outputs light with a wavelength and intensity suitable for the purpose of processing. Typically, an excimer laser that emits ultraviolet light with a wavelength of 351 nm to 353 nm (XeF), a wavelength of 308 nm (XeCl), or the like can be used. Alternatively, a second harmonic wavelength (515 nm, 532 nm, or the like) or a third harmonic wavelength (343 nm, 355 nm, or the like) of a solid-state laser such as a YAG laser or a fiber laser may be used. A plurality of laser oscillators 820 may be provided.

The optical system unit 821 includes a mirror, a beam expander, a beam homogenizer, or the like, for example, and can homogenize and expand the energy in-plane distribution of laser light 825 emitted from the laser oscillator 820.

As the mirror 822, a dielectric multilayer mirror can be used, for example, and is provided so that the incident angle of the laser light is substantially 45°. The microlens array 823 can have a shape such that a plurality of convex lenses are provided on the top surface or on the top and bottom surfaces of a quartz board, for example.

With the above-described laser crystallization apparatus, polycrystalline silicon layers with small variation in crystallinity can be formed.

At least part of this embodiment can be implemented in combination with any of the other embodiments described in this specification as appropriate.

Embodiment 3

In this embodiment, electronic devices of embodiments of the present invention are described with reference to the drawing.

Each of electronic devices described below is provided with a display device of one embodiment of the present invention in a display portion. Thus, the electronic devices achieve high resolution. In addition, the electronic devices can achieve both high resolution and a large screen.

The display portion of the electronic device of one embodiment of the present invention can display, for example, an image with a resolution of full high definition, 4K2K, 8K4K, 16K8K, or more. As a screen size of the display portion, the diagonal size can be greater than or equal to 20 inches, greater than or equal to 30 inches, greater than or equal to 50 inches, greater than or equal to 60 inches, or greater than or equal to 70 inches.

Examples of electronic devices include electronic devices with a relatively large screen, such as a television device, a desktop or laptop personal computer, a monitor of a computer or the like, digital signage, and a large game machine (e.g., a pachinko machine); a camera such as a digital camera or a digital video camera; a digital photo frame; a mobile phone; a portable game console; a portable information terminal; and an audio reproducing device.

The electronic device or a lighting device of one embodiment of the present invention can be incorporated along a curved inside/outside wall surface of a house or a building or a curved interior/exterior surface of a car.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays).

The electronic device of one embodiment of the present invention can have a variety of functions such as a function of displaying a variety of information (e.g., a still image, a moving image, and a text image) on the display portion, a touch panel function, a function of displaying a calendar, date, time, and the like, a function of executing a variety of software (programs), a wireless communication function, and a function of reading out a program or data stored in a recording medium.

Figure 22A:
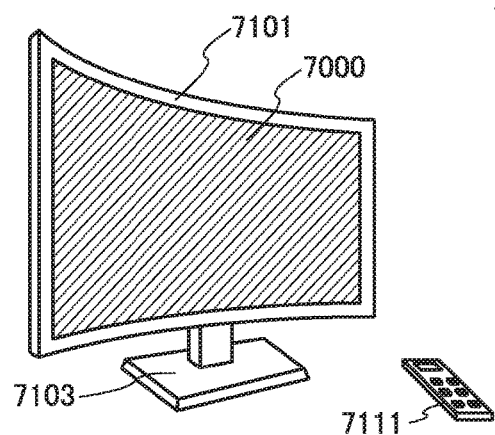
FIGS. 22A to 22D illustrate structure examples of electronic devices.

FIG. 22A illustrates an example of a television device. In a television device 7100, a display portion 7000 is incorporated in a housing 7101. Here, the housing 7101 is supported by a stand 7103.

The display device of one embodiment of the present invention can be used in the display portion 7000.

The television device 7100 illustrated in FIG. 22A can be operated with an operation switch provided in the housing 7101 or a separate remote controller 7111. Furthermore, the display portion 7000 may include a touch sensor. The television device 7100 can be operated by touching the display portion 7000 with a finger or the like. Furthermore, the remote controller 7111 may be provided with a display portion for displaying data outputted from the remote controller 7111. With operation keys or a touch panel of the remote controller 7111, channels and volume can be controlled and images displayed on the display portion 7000 can be controlled.

Note that the television device 7100 is provided with a receiver, a modem, and the like. With use of the receiver, general television broadcasting can be received. When the television device is connected to a communication network with or without wires via the modem, one-way (from a transmitter to a receiver) or two-way (between a transmitter and a receiver or between receivers) data communication can be performed.

Figure 22B:
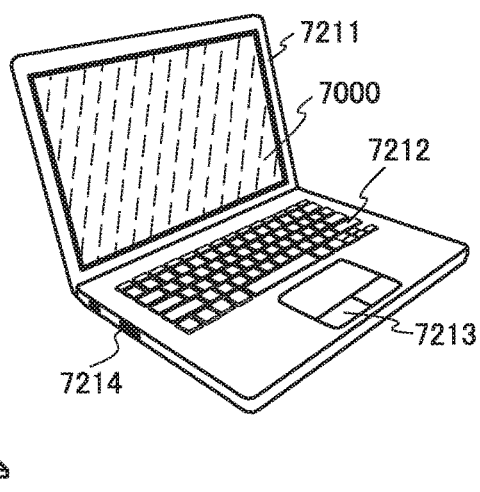

FIG. 22B illustrates a laptop personal computer 7200. The laptop personal computer 7200 includes a housing 7211, a keyboard 7212, a pointing device 7213, an external connection port 7214, and the like. In the housing 7211, the display portion 7000 is incorporated.

The display device of one embodiment of the present invention can be used in the display portion 7000.

Figure 22C:
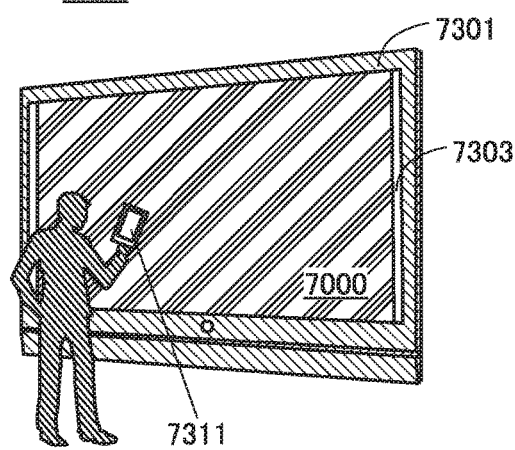
Figure 22D:
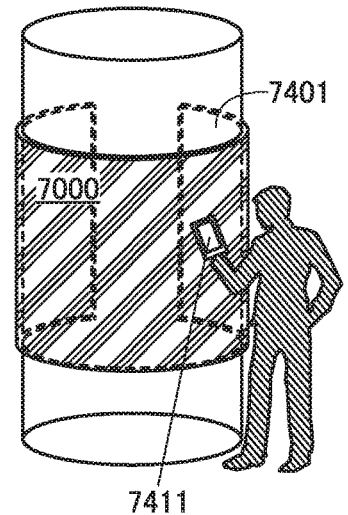

FIGS. 22C and 22D illustrate examples of digital signage.

Digital signage 7300 illustrated in FIG. 22C includes a housing 7301, the display portion 7000, a speaker 7303, and the like. Also, the digital signage 7300 can include an LED lamp, operation keys (including a power switch or an operation switch), a connection terminal, a variety of sensors, a microphone, and the like.

FIG. 22D illustrates digital signage 7400 mounted on a cylindrical pillar 7401. The digital signage 7400 includes the display portion 7000 provided along a curved surface of the pillar 7401.

The display device of one embodiment of the present invention can be used in each of the display portions 7000 illustrated in FIGS. 22C and 22D.

A larger area of the display portion 7000 can provide more information at a time. In addition, the larger display portion 7000 attracts more attention, so that the effectiveness of the advertisement can be increased, for example.

It is preferable to use a touch panel in the display portion 7000 because a device with such a structure does not just display a still or moving image, but can be operated by users intuitively. In the case where the display device of one embodiment of the present invention is used for providing information such as route information or traffic information, usability can be enhanced by intuitive operation.

Furthermore, as illustrated in FIGS. 22C and 22D, it is preferable that the digital signage 7300 or the digital signage 7400 work with an information terminal 7311 or an information terminal 7411 such as a smartphone a user has through wireless communication. For example, information of an advertisement displayed on the display portion 7000 can be displayed on a screen of the information terminal 7311 or 7411. Moreover, by operation of the information terminal 7311 or 7411, a displayed image on the display portion 7000 can be switched.

Furthermore, it is possible to make the digital signage 7300 or 7400 execute a game with use of the screen of the information terminal 7311 or 7411 as an operation means (controller). Thus, an unspecified number of people can join in and enjoy the game concurrently.

At least part of this embodiment can be implemented in combination with any of the other embodiments described in this specification as appropriate.

Embodiment 4

In this embodiment, an example of a television device for which a display device of one embodiment of the present invention is used is described with reference to drawings.

Figure 23A:
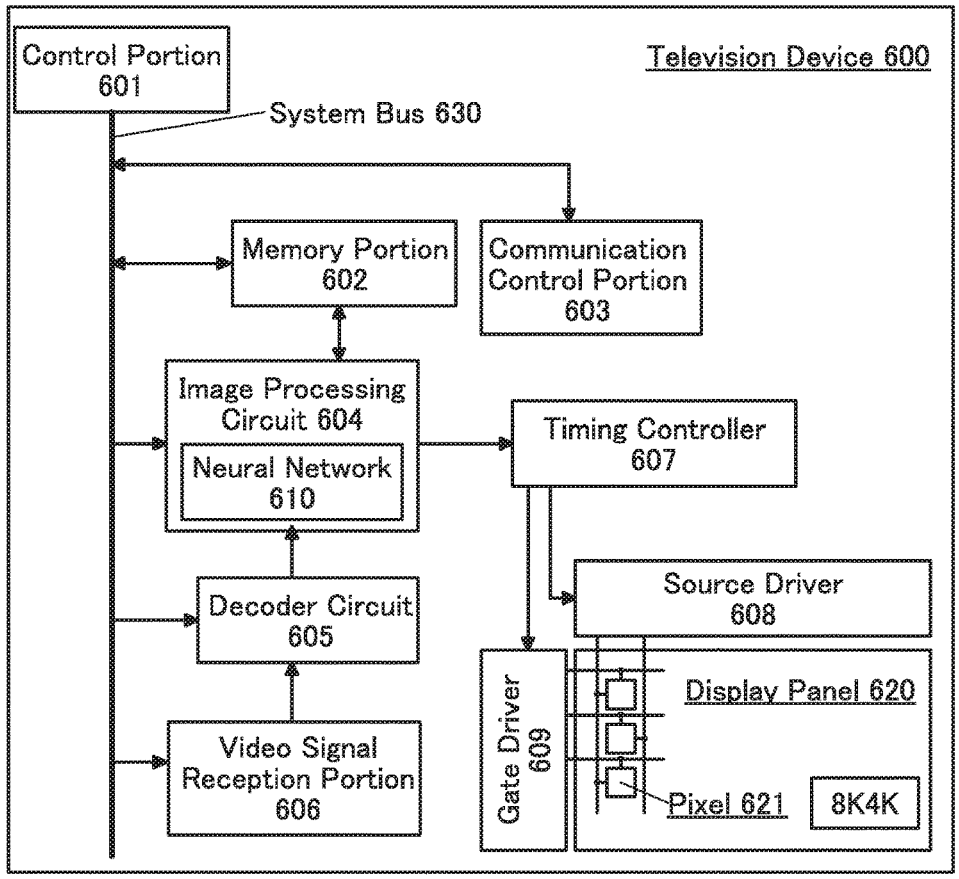
FIGS. 23A and 23B illustrate a structure example of a television device of one embodiment of the present invention.

FIG. 23A is a block diagram illustrating a television device 600.

Note that in a block diagram attached to this specification, components are classified according to their functions and shown as independent blocks; however, it is practically difficult to completely separate the components according to their functions, and one component may have a plurality of functions.

The television device 600 includes a control portion 601, a memory portion 602, a communication control portion 603, an image processing circuit 604, a decoder circuit 605, a video signal reception portion 606, a timing controller 607, a source driver 608, a gate driver 609, a display panel 620, and the like.

The display device described in the above embodiment can be used for the display panel 620 illustrated in FIG. 23A. Thus, the television device 600 with a large size, high resolution, and high visibility can be fabricated.

The control portion 601 can function as, for example, a central processing unit (CPU). For example, the control portion 601 has a function of controlling components such as the memory portion 602, the communication control portion 603, the image processing circuit 604, the decoder circuit 605, and the video signal reception portion 606 via a system bus 630.

Signals are transmitted between the control portion 601 and the components via the system bus 630. The control portion 601 has a function of processing signals inputted from the components which are connected via the system bus 630, a function of generating signals to be outputted to the components, and the like, so that the components connected to the system bus 630 can be controlled comprehensively.

The memory portion 602 functions as a register, a cache memory, a main memory, a secondary memory, or the like that can be accessed by the control portion 601 and the image processing circuit 604.

As a memory device that can be used as a secondary memory, a memory device that includes a rewritable non-volatile memory element can be used, for example. Examples of them include a flash memory, a magnetroresistive random access memory (MRAM), a phase change RAM (PRAM), a resistive RAM (ReRAM), and a ferroelectric RAM (FeRAM).

As a memory device that can be used as a temporary memory such as a register, a cache memory, or a main memory, a volatile memory element such as a dynamic RAM (DRAM) or a static random access memory (SRAM) may be used.

For example, as a RAM provided in the main memory, a DRAM is used, in which case a memory space as a workspace for the control portion 601 is virtually allocated and used. An operating system, an application program, a program module, program data, and the like which are stored in the memory portion 602 are loaded into the RAM and executed. The data, program, and program module which are loaded into the RAM are directly accessed and operated by the control portion 601.

In the ROM, a basic input/output system (BIOS), firmware, and the like for which rewriting is not needed can be stored. As the ROM, a mask ROM, a one-time programmable read only memory (OTPROM), or an erasable programmable read only memory (EPROM) can be used. As an EPROM, an ultra-violet erasable programmable read only memory (UV-EPROM) which can erase stored data by irradiation with ultraviolet rays, an electrically erasable programmable read only memory (EEPROM), a flash memory, and the like can be given.

Besides the memory portion 602, a detachable memory device may be connected to the television device 600. For example, it is preferable to provide a terminal connected to a storage media drive functioning as a storage device such as a hard disk drive (HDD) or a solid state drive (SSD) or a storage medium such as a flash memory, a Blu-ray Disc, or a DVD. With such a structure, an image can be stored.

The communication control portion 603 has a function of controlling communication exchanged via a computer network. For example, the communication control portion 603 controls a control signal for connection to a computer network in response to instructions from the control portion 601 and transmits the signal to the computer network. Accordingly, communication can be performed by connecting to a computer network such as the Internet, which is an infrastructure of the World Wide Web (WWW), an intranet, an extranet, a personal area network (PAN), a local area network (LAN), a campus area network (CAN), a metropolitan area network (MAN), a wide area network (WAN), or a global area network (GAN).

The communication control portion 603 may have a function of communicating with a computer network or another electronic device with a communication standard such as Wi-Fi (registered trademark), Bluetooth (registered trademark), or ZigBee (registered trademark).

The communication control portion 603 may have a function of wireless communication. For example, an antenna and a high frequency circuit (an RF circuit) are provided to receive and transmit an RF signal. The high frequency circuit converts an electromagnetic signal into an electric signal in a frequency band in accordance with respective national laws and transmits the electromagnetic signal wirelessly to another communication device. Several tens of kilohertz to several tens of gigahertz are a practical frequency band which is generally used. The high frequency circuit connected to an antenna includes a high frequency circuit portion compatible with a plurality of frequency bands; the high frequency circuit portion can include an amplifier, a mixer, a filter, a DSP, an RF transceiver, or the like.

The video signal reception portion 606 includes, for example, an antenna, a demodulation circuit, and analog-digital conversion circuit (AD converter circuit), and the like. The demodulation circuit has a function of demodulating a signal inputted from the antenna. The AD converter circuit has a function of converting the demodulated analog signal into a digital signal. The signal processed in the video signal reception portion 606 is transmitted to the decoder circuit 605.

The decoder circuit 605 has a function of decoding video data included in a digital signal inputted from the video signal reception portion 606, in accordance with the specifications of the broadcasting standard for transmitting the video data, and a function of generating a signal transmitted to the image processing circuit. For example, as the broadcasting standard in 8K broadcasts, H.265|MPEG-H high efficiency video coding (hereinafter referred to as HEVC) is given.

The antenna included in the video signal reception portion 606 can receive airwaves such as a ground wave and a wave transmitted from a satellite. The antenna can receive airwaves for analog broadcasting, digital broadcasting, image-sound-only broadcasting, sound-only broadcasting, or the like. For example, the antenna can receive airwaves transmitted in a certain frequency band, such as a UHF band (about 300 MHz to 3 GHz) or a VHF band (30 MHz to 300 MHz). When a plurality of pieces of data received in a plurality of frequency bands are used, the transfer rate can be increased and more information can thus be obtained. Accordingly, the display panel 620 can display an image with a resolution higher than the full high definition, such as 4K2K, 8K4K, 16K8K, or more.

Alternatively, the video signal reception portion 606 and the decoder circuit 605 may generate a signal using the broadcasting data transmitted with data transmission technology through a computer network. The signal is transmitted to the image processing circuit 604. In the case where a digital signal is received, the video signal reception portion 606 does not necessarily include a demodulating circuit, an AD converter circuit, and the like.

The image processing circuit 604 has a function of generating a video signal outputted to the timing controller 607, on the basis of a video signal inputted from the decoder circuit 605.

The timing controller 607 has a function of generating a signal (e.g., a clock signal or a start pulse signal) outputted to the gate driver 609 and the source driver 608 on the basis of a synchronization signal included in a video signal or the like on which the image processing circuit 604 performs processing. In addition, the timing controller 607 has a function of generating a video signal outputted to the source driver 608, as well as the above signal.

The display panel 620 includes a plurality of pixels 621. Each pixel 621 is driven by a signal supplied from the gate driver 609 and the source driver 608. Here, an example of a display panel with the 7680×4320 pixels, i.e., the resolution corresponding to the standard of 8K4K, is shown. Note that the resolution of the display panel 620 is not limited to the above, and may have a resolution corresponding to the standard such as full high-definition (the number of pixels is 1920×1080) or 4K2K (the number of pixels is 3840×2160).

The control portion 601 or the image processing circuit 604 illustrated in FIG. 23A may include, for example, a processor. For example, a processor functioning as a central processing unit (CPU) can be used for the control portion 601. Another processor such as a digital signal processor (DSP) or a graphics processing unit (GPU) can be used, for example for the image processing circuit 604. Furthermore, such a processor obtained with a programmable logic device (PLD) such as a field programmable gate array (FPGA) or a field programmable analog array (FPAA) may be used for the control portion 601 or the image processing circuit 604.

The processor interprets and executes instructions from various programs to process various kinds of data and control programs. The programs executed by the processor may be stored in a memory region included in the processor or a memory device which is additionally provided.

Two or more functions among the functions of the control portion 601, the memory portion 602, the communication control portion 603, the image processing circuit 604, the decoder circuit 605, the video signal reception portion 606, and the timing controller 607 are aggregated in one IC chip to form a system LSI. For example, such a system LSI may include a processor, a decoder circuit, a tuner circuit, an AD converter circuit, a DRAM, an SRAM, and the like.

Note that a transistor that includes an oxide semiconductor in a channel formation region and that has an extremely low off-state current can be used in an IC or the like included in the control portion 601 or another component. With use of the transistor having an extremely low off-state current as a switch for holding electric charge (data) which flows into a capacitor functioning as a memory element, a long data retention period can be ensured. By utilizing this characteristic for a register or a cache memory of the control portion 601 or the like, normally-off computing is achieved where the control portion 601 operates only when needed and data on the previous processing is stored in the memory element in the rest of time; thus, power consumption of the television device 600 can be reduced.

Note that the structure of the television device 600 illustrated in FIG. 23A is just an example, and all of the components illustrated here are not necessarily included. The television device 600 may include at least necessary components among the components illustrated in FIG. 23A. Furthermore, the television device 600 may include a component other than the components illustrated in FIG. 23A.

For example, the television device 600 may include an external interface, a sound output portion, a touch panel unit, a sensor unit, a camera unit, or the like besides the components illustrated in FIG. 23A. Examples of the external interfaces include an external connection terminal such as an universal serial bus (USB) terminal, a local area network (LAN) connection terminal, a power reception terminal, a sound output terminal, a sound input terminal, a video output terminal, and a video input terminal, a transceiver for optical communication using infrared rays, visible light, ultraviolet rays, or the like, a physical button provided on a housing, or the like. Examples of sound input/output portions include a sound controller, a microphone, and a speaker.

The image processing circuit 604 is described in detail below.

The image processing circuit 604 preferably has a function of performing image processing on the basis of a video signal inputted from the decoder circuit 605.

Examples of the image processing include noise removal, grayscale conversion, tone correction, and luminance correction. As the tone correction or the luminance correction, gamma correction can be given, for example.

Furthermore, the image processing circuit 604 preferably has a function of pixel interpolation in accordance with up-conversion of the resolution, a function of frame interpolation in accordance with up-conversion of the frame frequency, or the like.

The noise removing process is a process for removing various noise, such as mosquito noise which appears near outline of texts and the like, block noise which appears in high-speed moving images, random noise causing flicker, and dot noise caused by up-conversion of the resolution.

The grayscale conversion processing converts the grayscale of an image to a grayscale corresponding to output characteristics of the display panel 620. For example, in the case where the number of grayscale levels is increased, gradation values of pixels are interpolated and assigned to respective images inputted with low grayscale levels, so that a smooth histogram can be obtained. In addition, a high-dynamic range (HDR) processing for increasing the dynamic range is also included in the grayscale conversion processing.

The pixel interpolation process interpolates data which does not actually exist when resolution is up-converted. For example, referring pixels around the target pixel, data is interpolated to display intermediate color between the pixels.

The tone correction process corrects the tone of an image. The luminance correction process corrects the brightness (luminance contrast) of an image. For example, these processes detect a type, luminance, color purity, and the like of a lighting in a space where the television device 600 is provided, and corrects luminance and tone of images displayed on the display panel 620 to be optimal luminance and tone in accordance with the detection. These processes can have a function of referring a displayed image to various images of various scenes in an image list stored in advance, and then correcting luminance and tone of the displayed image to be suitable to the images in the closest scene of the image.

In the case where the frame frequency of the displayed video is increased, the frame interpolation generates an image for a frame that does not exist originally (interpolation frame). For example, an image for an interpolation frame which is interposed between two images is generated from a difference between the two images. Alternatively, images for a plurality of interpolation frames can be generated between two images. For example, when the frame frequency of a video signal inputted from the decoder circuit 605 is 60 Hz, a plurality of interpolation frames are generated, and the frame frequency of a video signal outputted to the timing controller 607 can be increased twofold (120 Hz), fourfold (240 Hz), eightfold (480 Hz), or the like.

The image processing circuit 604 preferably has a function of performing image processing utilizing a neural network. FIG. 23A illustrates an example in which the image processing circuit 604 includes a neural network 610.

For example, with the neural network 610, features can be extracted from image data included in a video. In addition, the image processing circuit 604 can select an optimal correction method in accordance with the extracted feature or select a parameter used for the correction.

Alternatively, the neural network 610 itself may have a function of performing image processing. In other words, the neural network 610 may receive image data on which image processing is not performed and output image data that has been subjected to image processing.

Data of a weight coefficient used for the neural network 610 is stored in the memory portion 602 as a data table. The data table including the weight coefficient can be updated, for example, by the communication control portion 603 through the computer network. Alternatively, the image processing circuit 604 may have a learning function and enable the update of the data table including the weight coefficient.

Figure 23B:
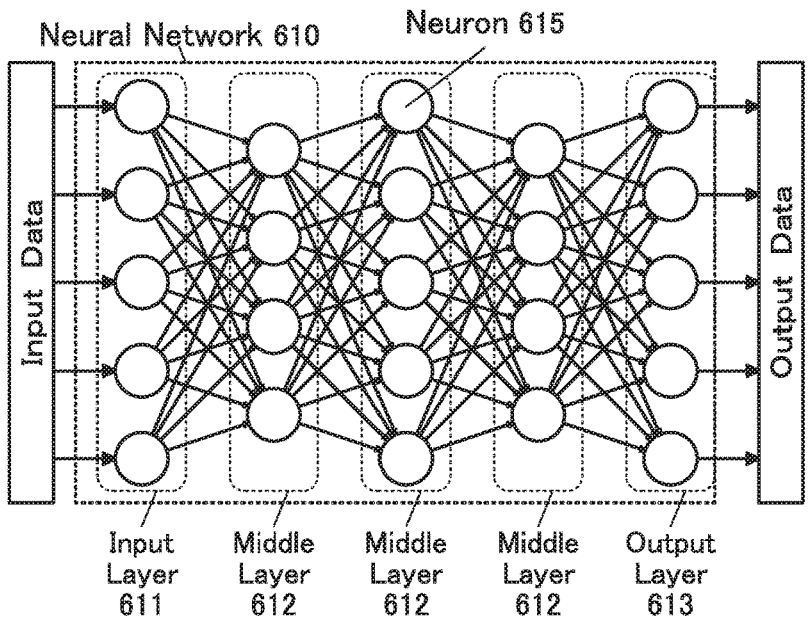

FIG. 23B is a schematic view illustrating the neural network 610 included in the image processing circuit 604.

In this specification and the like, the neural network indicates a general model having the capability of solving problems, which is modeled on a biological neural network and determines the connection strength of neurons by the learning. The neural network includes an input layer, a middle layer (also referred to as hidden layer), and an output layer. A neural network having two or more middle layers is referred to as deep neural network (DNN), and the learning using such a DNN is referred to as deep learning.

In the description of the neural network in this specification and the like, to determine a connection strength of neurons (also referred to as weight coefficient) from the existing data is called "leaning" in some cases. In this specification and the like, to form a neural network using the connection strength obtained by the learning, to lead to a new conclusion, is called "inference" in some cases.

The neural network 610 includes an input layer 611, one or more middle layers 612, and an output layer 613. Input data is inputted to the input layer 611. Output data is outputted from the output layer 613.

Each of the input layer 611, the middle layer 612, and the output layer 613 includes neurons 615. The neuron 615 indicates a circuit element that performs product-sum operation (product-sum operation element). In FIG. 23B, directions of inputting/outputting data between the two neurons 615 in two layers are denoted by arrows.

The arithmetic processing in each layer is executed by the product-sum operation of an output of the neuron 615 in the previous layer and a weight coefficient. For example, when the output from an i-th neuron in the input layer 611 is denoted by $x_i$, and the connection strength (weight coefficient) between the output $x_i$, and a j-th neuron in the middle layer 612 next to the input layer 611 is denoted by $w_{ji}$, the output from the j-th neuron in the middle layer can be denoted by $y_j=f(\Sigma w_{ji} \cdot x_i)$. Note that i and j are each an integer greater than or equal to 1. Here, f(x) represents an activation function, and a sigmoid function, a threshold function, or the like can be used therefor. In this manner, the output of the neuron 615 in each layer is a value obtained from the activation function with respect to the result of product-sum operation of the output from the neuron 615 in the previous layer and the weight coefficient. The connection between layers may be a full connection where all of the neurons are connected or a partial connection where part of neurons is connected.

FIG. 23B illustrates an example including three middle layers 612. The number of the middle layers 612 is not limited to three, and a structure including at least one middle layer is acceptable. The number of neurons included in one middle layer 612 may be changed as appropriate depending on the specifications. For example, the number of the neurons 615 included in one middle layer 612 may be larger or smaller than the number of the neurons 615 included in the input layer 611 or the output layer 613.

The weight coefficient functioning as an indicator of the connection strength between the neurons 615 is determined by learning. Although the learning may be executed by the processor in the television device 600, it is preferable to execute the learning with a calculator having high arithmetic processing properties, such as a dedicated server or a cloud. The weight coefficient determined by the learning is stored in the memory portion 602 as the data table and used when the weight coefficient is read out by the image processing circuit 604. The table can be updated as needed through the computer network.

The above is the description of the neural network.

At least part of this embodiment can be implemented in combination with any of the other embodiments described in this specification as appropriate.

REFERENCE NUMERALS

10: display device, 11: substrate, 12: substrate, 20: liquid crystal element, 21: conductive layer, 22: liquid crystal, 23: conductive layer, 24a: alignment film, 24b: alignment film, 26: insulating layer, 30: transistor, 31: conductive layer, 31a: conductive layer, 31b: conductive layer, 31at: conductive layer, 31bt: conductive layer, 32: semiconductor layer, 32p: semiconductor layer, 33: conductive layer, 33a: conductive layer, 33b: conductive layer, 33c: conductive layer, 33at: conductive layer, 33bt: conductive layer, 33ct: conductive layer, 34: insulating layer, 35: impurity semiconductor layer, 37: semiconductor layer, 38: connection portion, 39a: polarizing plate, 39b: polarizing plate, 41: coloring layer, 42: light-blocking layer, 50: light, 60: capacitor, 81: insulating layer, 82: insulating layer, 83: insulating layer, 84: insulating layer, 85: insulating layer, 86: conductive layer, 87: conductive layer, 88: insulating layer, 90: backlight unit, 600: television device, 601: control portion, 602: memory portion, 603: communication control portion, 604: image processing circuit, 605: decoder circuit, 606: video signal reception portion, 607: timing controller, 608: source driver, 609: gate driver, 610: neural network, 611: input layer, 612: middle layer, 613: output layer, 615: neuron, 620: display panel, 621: pixel, 630: system bus, 812: moving mechanism, 813: moving mechanism, 815: stage, 816: ball screw mechanism, 820: laser oscillator, 821: optical system unit, 822: mirror, 823: microlens array, 824: mask, 825: laser light, 826: laser light, 827: laser beam, 830: substrate, 840: amorphous silicon layer, 841: polycrystalline silicon layer, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, and 7411: information terminal.

This application is based on Japanese Patent Application Serial No. 2017-004934 filed with Japan Patent Office on Jan. 16, 2017 and Japanese Patent Application Serial No. 2017-011397 filed with Japan Patent Office on Jan. 25, 2017, the entire contents of which are hereby incorporated by reference.

The invention claimed is:

1. A display device comprising:
   a first wiring;
   a second wiring;
   a third wiring;
   a fourth wiring;
   a first transistor;
   a second transistor;
   a first conductive layer; and
   a second conductive layer,
   wherein the third wiring and the fourth wiring extend in a first direction, are arranged in a second direction intersecting with the first direction, and intersect with the first wiring and the second wiring,
   wherein the first wiring and the second wiring extend in the second direction and are arranged in the first direction,
   wherein a gate of the first transistor is electrically connected to the third wiring, one of a source and a drain of the first transistor is electrically connected to the first wiring, and the other of the source and the drain of the first transistor is electrically connected to the first conductive layer,
   wherein a gate of the second transistor is electrically connected to the fourth wiring, one of a source and a drain of the second transistor is electrically connected to the second wiring, and the other of the source and the drain of the second transistor is electrically connected to the second conductive layer,
   wherein each of the first conductive layer and the second conductive layer comprises a portion overlapping with part of the second wiring,
   wherein the first wiring and the second wiring are supplied with respective signals, and
   wherein the third wiring and the fourth wiring are supplied with the same selection signal.

2. The display device according to claim 1, further comprising:
   a liquid crystal:
   a first coloring layer; and
   a second coloring layer,
   wherein the liquid crystal and the first coloring layer overlap with the first conductive layer,
   wherein the liquid crystal and the second coloring layer overlap with the second conductive layer, and
   wherein the first coloring layer and the second coloring layer transmit light of the same color.

3. The display device according to claim 2, further comprising:
   a fifth wiring;
   a sixth wiring;
   a third transistor;
   a fourth transistor;
   a third conductive layer; and
   a fourth conductive layer,
   wherein the fifth wiring and the sixth wiring extend in the second direction,
   wherein a gate of the third transistor is electrically connected to the third wiring, one of a source and a drain of the third transistor is electrically connected to the fifth wiring, and the other of the source and the drain of the third transistor is electrically connected to the third conductive layer, wherein a gate of the fourth transistor is electrically connected to the fourth wiring, one of a source and a drain of the fourth transistor is electrically connected to the sixth wiring, and the other of the source and the drain of the fourth transistor is electrically connected to the fourth conductive layer, wherein each of the third conductive layer and the fourth conductive layer comprises a portion overlapping with part of the sixth wiring, and wherein the fifth wiring and the sixth wiring are supplied with respective signals.

4. The display device according to claim 3, further comprising:

a third coloring layer; and a fourth coloring layer, wherein the liquid crystal and the third coloring layer overlap with the third conductive layer, wherein the liquid crystal and the fourth coloring layer overlap with the fourth conductive layer, and wherein the third coloring layer and the fourth coloring layer transmit light of the same color whose color is different from the color of the light transmitted through the first coloring layer.

5. The display device according to claim 3, wherein the fifth wiring is positioned between the second wiring and the sixth wiring.

6. The display device according to claim 3, wherein the sixth wiring is positioned between the second wiring and the fifth wiring.

7. The display device according to claim 1, wherein the first transistor comprises a first semiconductor layer, wherein the second transistor comprises a second semiconductor layer, and wherein each of the first semiconductor layer and the second semiconductor layer comprises a portion positioned between the first wiring and the second wiring.

8. The display device according to claim 7, wherein each of the first semiconductor layer and the second semiconductor layer comprises metal oxide.

9. The display device according to claim 7, wherein each of the first semiconductor layer and the second semiconductor layer comprises amorphous silicon.

10. The display device according to claim 7, wherein each of the first semiconductor layer and the second semiconductor layer comprises microcrystalline silicon or polycrystalline silicon.

11. The display device according to claim 1, further comprising a capacitor electrically connected to the first transistor, wherein the capacitor is positioned between the first wiring and the second wiring, and wherein the capacitor comprises a portion overlapping with the first conductive layer.

12. The display device according to claim 11, wherein the capacitor comprises a fifth conductive layer and a sixth conductive layer, and wherein each of the fifth conductive layer and the sixth conductive layer is configured to transmit visible light.

* * * * *